(12) United States Patent
Clements

(10) Patent No.: US 11,397,509 B1
(45) Date of Patent: Jul. 26, 2022

(54) MIXED REALITY GLASSES THAT DISPLAY A MID-AIR TOUCH CONTROL PANEL FOR PUBLIC MULTIUSER DEVICES

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 40 days.

(21) Appl. No.: 17/067,786

(22) Filed: Oct. 12, 2020

Related U.S. Application Data

(63) Continuation-in-part of application No. 15/853,934, filed on Dec. 25, 2017, now Pat. No. 10,802,582, which is a continuation-in-part of application No. 14/634,788, filed on Feb. 28, 2015, now Pat. No. 10,691,397, which is a continuation-in-part of application No. 14/258,013, filed on Apr. 22, 2014, now Pat. No. 9,477,317.

(51) Int. Cl.
*G06F 3/04815* (2022.01)
*G06F 3/04842* (2022.01)
*G06F 3/01* (2006.01)
*G02B 27/01* (2006.01)

(52) U.S. Cl.
CPC ..... *G06F 3/04815* (2013.01); *G02B 27/0172* (2013.01); *G06F 3/017* (2013.01); *G06F 3/04842* (2013.01); *G02B 2027/014* (2013.01); *G02B 2027/0178* (2013.01); *G06F 3/011* (2013.01); *G06F 2203/04802* (2013.01)

(58) Field of Classification Search
CPC ............. G06F 3/04815; G06F 3/04842; G06F 2203/04802; G02B 27/0172; G02B 2027/014; G02B 2027/0178
See application file for complete search history.

(56) References Cited

U.S. PATENT DOCUMENTS

2016/0253044 A1* 9/2016 Katz ................... G06F 3/04842
345/156

* cited by examiner

*Primary Examiner* — Michael C Zarroli

(57) ABSTRACT

Mixed reality glasses, hygienically operate a public device, whose physical control panel, is touched by other users. The glasses display the device's control panel, in midair. A user touches, the control panel's input icons, to activate the icons. The activated icons, activate operations, of the device. The devices can be operated one, after another, such as, an elevator, and then a vending machine. The glasses download the devices, operating control panel wirelessly, when close to the device. The devices locations, are shown, on a midair map. By touching air molecules, when touching the input icons, a smart toilet, is operated sanitarily. The icons, remove the need to touch, a self serve store's checkout physical input buttons, that may have viruses on them. The mid-air icons, can aide a wheelchair user, when operating a public self driving car, by allowing the car's input icons, to be located near them.

18 Claims, 12 Drawing Sheets

MIXED REALITY GLASSES THAT DISPLAY A MID-AIR TOUCH CONTROL PANEL FOR PUBLIC MULTIUSER DEVICES

CROSS REFERENCE TO RELATED APPLICATIONS

This present application is a continuation in part of application, Ser. No. 15/853,934, filled 2017 Dec. 25, which is a continuation in part of application Ser. No. 14/634,788, filled 2015 Feb. 28, which is a continuation in part of application Ser. No. 14/258,013 filed 2014 Apr. 22. All of the foregoing applications are hereby incorporated herein by reference in their entirety.

FEDERALLY SPONSORED RESEARCH: Not Applicable

SEQUENCE LISTING: Not Applicable

TECHNICAL FIELD OF THE EMBODIMENTS

The present invention relates to mixed reality glasses, displaying holograms in mid-air, and user touch interaction with the holograms.

BACKGROUND OF THE EMBODIMENTS

Avoiding Bacteria on Physical Touch Input Buttons

People have been touching buttons to operates public devices, for a long time, like, elevators. Many people don't like to touch input buttons, that may have harmful bacteria on them, such as, public input control panels.

Control panel input buttons, which are touched by multiple users, have the problem of accumulating germs on their surfaces, which are transferred from the users to the buttons. The bacteria on the buttons, may be transferred to the users, when they touch the buttons.

Avoiding finger contact with a touch input button, reduces the contact, and transmission, of possibly harmful pathogens on the button. Reducing or eliminating bacterial transmission, from the buttons to the user, reduces the possibility of the user becoming ill, from bacteria transmitted to the user.

A Proximity Sensor Used to Detect a User's Hand in

Infrared hand sensors are used to operate devices in bathrooms, without a surface, such as, water faucets of sinks, toilet flushers, and hand dryers. In Hospitals motion sensing is used to open doors, without a user needing to touch a surface. The sensors have limited input commands, such as, on or off, which restricts the number of different inputs that can be used.

Input Buttons Used to Operate Devices

Input buttons, can be touched, and used as input buttons for a device. The buttons can be made by devices, that project on to water droplets, optical illusion devices, and lasers beam projecting plasma. A camera detects when the user touches the button, with their finger.

Since there aren't bacteria on the glasses that aren't the user's, the finger avoids contacting other users' bacteria, when contacting the devices buttons. Though the touch free devices are stationary, and not portable.

Ineffective Ways to Avoid Bacteria

Some people try to wrap paper around their hand, before control panel buttons, to try to put an antibacterial barrier between their hand and the buttons. The paper barrier is ineffective, since bacteria can easily travel through paper.

People may try to use a piece of clothing, such as, a part of a shirt sleeve as a barrier between the buttons, and the hand. The shirt sleeve may act as a barrier; though bacteria can attach to the user's shirt sleeve.

Disposable rubber gloves may be effective, in blocking bacteria, and using the buttons sanitarily, though it may be inconvenient to carry, and use gloves. Anti-bacterial swipes can be used to eliminate bacteria on buttons, though the discarded wipes produce waste.

Use of antibacterial hand lotion requires, the user to carry the lotion, and may dry out the user's skin. Hand lotion machines, aren't outside a building, if the user has to touch a door opening button, or door surface when leaving the building.

Maps Unable to Find Multiuser Public Devices

Multiuser public devices, like, smart toilets locations may not be shown on internet maps, which may make it difficult for a user to find the smart toilet.

A Mixed Reality Glasses Unable to Operate Multiuser Public Devices

A user may not be able to operate multiuser public devices, with mid-air touch of mid-air input buttons, with their glasses, like, an elevator, because the glasses are unable to connect with the elevator, have the elevators control panel shown on the glasses' display, and or the have the control panel interact with the elevator, or interact with other elevators, or different elevators.

The glasses are unable to operate one device and then another different device, in a public setting, such as, operate the elevator, exit the elevator, then operate a multiuser vending machine, and after getting a candy bar from the machine, operate a public self-driving car

DISADVANTAGES

Many of the devices used to avoid input buttons, used to operate a device, heretofore known suffer from several disadvantages:

a) Bacteria, and viruses can be transmitted to users, who touch control panel buttons on a multiuser touch screen display.

b) A user, that uses a wheelchair, may have difficulty accessing, public multiuser devices control panels, without being near the device's physical control panel, such as, reaching an elevator control panel, in a crowded elevator.

c) A static electric discharge may be created as a user touches an input screen, or input button, which maybe be hazardous in flammable environments.

d) A user needs to know where the devices locations are, an elevator may not be shown on a map.

SUMMARY

A map is shown on glasses' display. Different multiuser public devices, like, elevators, or smart toilets, are shown on the map. When a user is close to the multiuser devices, they can operate the device with the glasses.

The device's control panel is down loaded to the device, when the user is near the device. The control panel is displayed in mid-air by the glasses. The control panel input buttons, are activated by touch from the user.

The mid-air devices displayed control panels, allows a user to bypass touching a physical control panel for a device. Avoiding touching physical control panels allows the user to avoid touching, other users' bacteria on the control panels. The panel is opened manually by the user, touching the devices displayed icon, or can be opened automatically, and displayed when the glasses, are near the device, like, a distance of 15 meters.

The device sends the glasses information, about the input's effect on the operation of the device, which the glasses displays, such as, after activation elevator floor number 4, the number floor lights up.

The shared devices locations are shown on a map display on the glasses, allowing the user to locate the devices. A computer route can use graphic displays to give directions. vocalization of the directions can be produced over a speaker in the glasses, and connected to the computer.

The glasses can connect to the device, using radio waves to connect through an internet, or by using radio waves directly, or using a combination of both.

Two Ways to Connect to the Device, Internet, or Radio Waves

The user locates the communal device on the map, and moves to it. At the device, the user touches the devices icon shown on the map. The device and glasses connect using radio waves, such as, Bluetooth, 5G, or WIFI direct. The glasses download the device's control panel. The glasses operate the device, with the control panel displayed. The next time the device is operated, the panel is retrieved from the glasses storage, where it was stored on first use.

The internet is used to allow devices, such as, elevators, store checkout payment machines, and smart toilets, to be operated by the glasses.

The devices, and glasses connect through the servers that are connected to the internet. The serves use location information from the glasses, and devices to plot their locations on an internet map.

The glasses, and devices locations are determined by using, location devices, such as, Global Positioning System devices GPS. The map's streets, buildings, glasses' location, and devices locations are shown on the glasses' displayed map. The displayed map allows the user, to find a chosen device.

Touch input into the interface, activates the operation of the device, being touched. The activated operation is sent to the device. The received input activates a function of the device, which operates the device.

Users Avoid Contact with Bacteria

Users avoid contact with bacteria, which may be harmful bacteria, by operating the device, by using the glasses, to display the devices interactive control panel, in mid-air.

When they touch a button on a physical control panel, there also touching the bacteria left on the button, from the last users to touch the button. Some of the bacteria, left on input buttons maybe harmful. The bacteria can be transmitted from the button, to the user's finger, and then to the user's body, from the user's body to other people, and other input buttons.

The user can operate the device, without contacting bacteria which may be on the device's physical touch input buttons. The glasses are connected wirelessly to the device. User Input into the glasses's touch screen, influences the operation of the device

ADVANTAGES

There are multiple benefits to a user from using, map to find a device, operate the device, and a with the device's control panel, user interface down loaded from the map, used to operate a device.

a) A user can avoid, contact with bacteria, and viruses on physical input buttons, by replacing the physical buttons with, bacteria free, mid-air input buttons, and using touch to activate them in mid-air.

b) Glasses find and operates devices, that can be in work place environments, that have bacteria, to avoid bacteria, such as, hospitals. The glasses may reduce the spread of anti-biotic resistant super bacteria, when used to operate hospital devices, such as, hospital elevators.

c) A user, that uses a wheelchair, can access, the public multiuser devices control panels, on the glasses, without being near the device's physical control panel, such as, an elevator control panel, in a crowded elevator.

d) A user may inadvertently touch, a touch free hand sensor device, like, a public bathroom sink faucet with a motion detector. While turning the faucet on, it may be the difficult to judge a finger's distance, which may lead to the finger inadvertently touching the faucet, which may have bacteria on it. The glasses can turn the faucet on, with mid-air touch.

e) The glasses' system, allows the user to find a multiuser public device's location, like, an ATM, and operate it, by viewing its location, and the glasses' location, on a displayed map on a display, and inputting into the Atm's control panel.

f) People who need to inhale oxygen, for health reasons. Receive the oxygen through a facemask, or nasal hose, from an oxygen tank need to avoid sparks that might ignite the oxygen gas, that is near the user's face. The glasses, limit producing a static electric spark, by limiting contact with physical input buttons of a control panel for the tank.

g) Glasses can be used to reduce dust. Dust produced by typing on physical keyboards is reduce, by typing on a mid-air virtual keyboard, which may be useful in dust free environments, such as, in a semiconductor production area.

h) A community self-driving car, and other public devices control panels, get download to their glasses' easily, or if the glasses used the device before, are taken from the glasses' storage, which stored the control pane at first use of the device.

i) Added security when inputting a Pin number into an Atm, due to the glasses', not being in the view of a spy camera.

j) The multiuser devices control panels, don't need to be in a set location, like, an Atm physical input buttons. The control panels, moves with the glasses movement, the user can be viewing their surroundings, and people behind them while they operate the Atm, which may add to secure operation.

k) The mid-air display reduces or eliminates physical control panels, such as, a self-driving car doesn't need to have 3-4 control displays around the car, with in touch of users, to operate the car, they can use their glasses at any location.

l) Each device mid-air control panel, can be customized to what the user like, such as, a green color theme, or travel destination. The user may feel more connected to a touch screen display control panel, that they have input into its design, then a devices physical control panel, like, a self-serve store checkout physical control panel.

m) The glasses are able to operate one device, then another different device, in a public setting, such as, operate an elevator, and exit the elevator then operate a fast-food restaurant kiosk menu buttons in mid-air, and after getting a hamburger, operate a community self-driving car.

n) Glasses automatically downloads a device's operating control panel, such as, a smart toilet. The automatic wireless download, eliminates a step of pre-installing into the glasses, the device's menu, and allows users to operate new devices that are used for the first time.

o) The glasses, automatically can active a control panel download, from a device, like, elevator due to the computer in the glasses, and elevator being near each other.

There is a desire, to provide an improved operation of a multiuser device, by glasses, having a touch user interface, in mid-air. The improvement to the mid-air touch glasses, is the connection of the glasses, to different public devices, a map showing the glasses', and device's locations, and the sanitary operation of the devices, by the glasses.

The glasses give a user interaction to the shared devices, like, finding. and operating elevators. The system brings the glasses to a new level of interaction with the multiuser devices, by allowing the glasses, to find, and operate the public devices.

A user to find and operate different devices, with the glasses advantageously. The devices are operated by the glasses touch freely, with mid-air touch of input icons, which allows operation of the community devices, by the user, free of contact with viruses.

Using the glasses display to find and operate different devices, brings the future, of sanitary, fun, device input diversity, and safe user input, to the present now.

Public devices, are now able to be found, and operated by a user with mid-air touch glasses. Still further benefits of the glasses, used to operate different devices, and the map to find them, will become apparent from a study of the following description, accompanying drawings.

BRIEF DESCRIPTION OF THE DRAWINGS—Figures

FIGS. 1A, and 1B show perspective views, of a mixed reality glasses with mid-air input icons, for a self-serve store checkout machine.

| REFERENCE NUMBERS | |
|---|---|
| 110 | off icon |
| 124 | on |
| 106 | control panel display |
| 108 | enter |
| 118 | in the glasses |
| 122 | highlighted area |
| 202 | glasses |
| 208 | elevator |
| 210 | user |
| 212 | physical control panel |
| 214 | virtual elevator control panel |
| 222 | number 5 icon |
| 224 | finger tracker |
| 304 | back-wash operation |
| 308 | smart toilet |
| 310 | user |
| 312 | front-wash icon |
| 314 | mid-air control panel |
| 316 | low temperature |
| 318 | high temperature |
| 320 | increase water temp |
| 322 | decrease water temp |
| 404 | glasses |
| 426 | cell glasses tower |
| 442 | smart toilet |
| 448 | medical device |
| 450 | microwave cellular connection |
| 454 | a WIFI connection |
| 456 | local Area Network |
| 458 | Bluetooth radio waves |
| 462 | elevator |
| 464 | internet |
| 468 | server |
| 902 | glasses |
| 904 | number 8 icon |
| 906 | a credit card reader |
| 910 | user |
| 912 | number 2 |
| 914 | cancel |
| 918 | credit card reader |
| 920 | purchase amount |
| 924 | finger trackers |
| 1402 | touch point on map |
| 1404 | holographic control panel input display |
| 1406 | radio display |
| 1408 | car dash board |
| 1412 | a switch to another device |
| 1414 | glasses |
| 1416 | low volume indicator |
| 1418 | high volume scale |
| 1420 | increase volume icon |
| 1422 | decrease volume icon |
| 1424 | station indicator |
| 1426 | radio change station increase |
| 1430 | compass |
| 1432 | internet map |
| 1434 | present location |
| 1436 | chosen route |
| 1438 | alternate route |
| 1440 | start travel icon |
| 1442 | stop travel icon |
| 1444 | desired location |
| 1446 | voice |
| 1448 | location search |

DETAILED DESCRIPTION FIRST EMBODIMENT

A Self Driving Car's Control Panel Displayed on a Mixed Reality Glasses Mid Air Display Description Finding a Public Self-Driving Car by Viewing the Self-Driving Car's Location on a Map Finger Tracker Input Device in a Mixed Reality Glasses Description An augmented reality AR headset, a mixed reality MR headset or glasses 1414, merged reality MR2 glasses, and virtual reality VR has a finger tracking sensor. The headset displays mid-air input icons 1404, in, FIGS. 5, and 6. The finger tracker in the headset, detects when the finger occupies the same space as one of the icons, and can activate the icon upon the detection, which allows a user's finger contact of the icons, to activate the input icons. The display can also be beamed into the user's eyes, with a projector in the glasses.

The User can Find a Taxi Car

Figure 5:
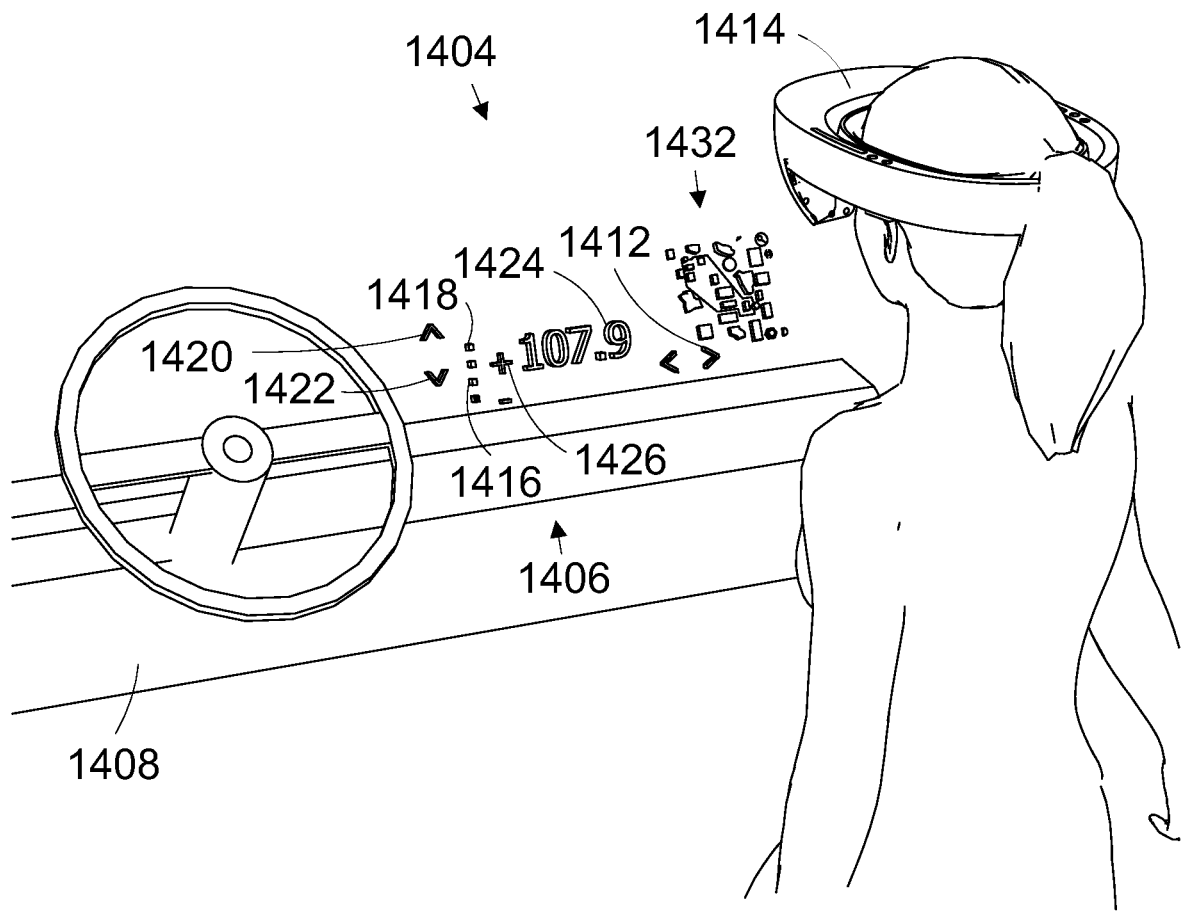
FIG. 5 shows a perspective view, of touch input icons, for a ride sharing self-driving car, displayed by mixed reality glasses, and a map.
Figure 6:
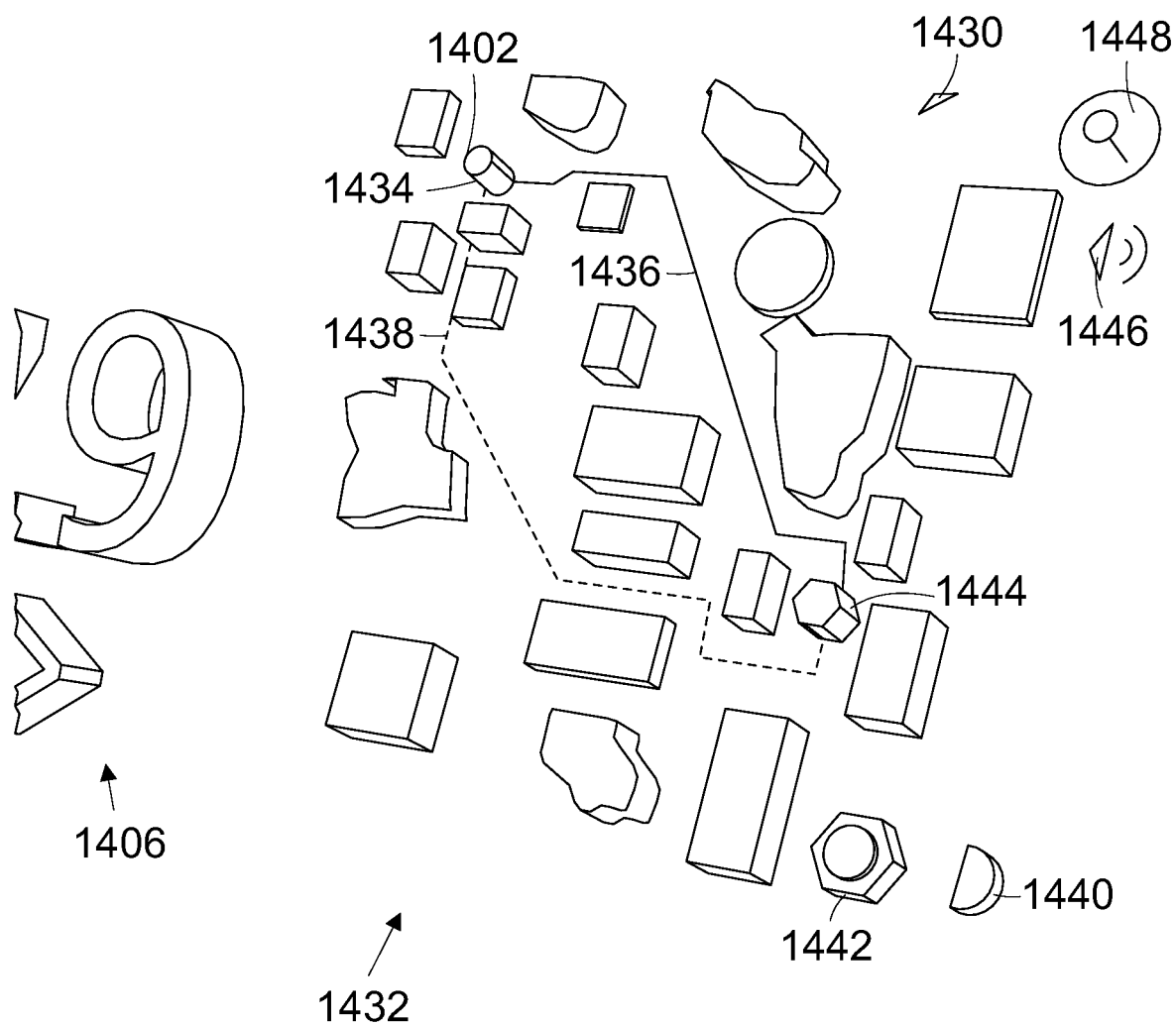
FIG. 6 shows a close-up perspective view, of touch input icons, for a ride sharing self-driving car, displayed by mixed reality glasses, and a map.

The user can find a taxi car that drives itself. The self-driving car's, location, on a displayed map, on glasses 1106, as shown in FIGS. 5, and 6.

The glasses have a global positioning system GPS, and the car has a GPS. The position of the glasses, and car plotted on a map on the server, such as, an internet map. The map determines the distance from the glasses, to the car.

The user finds the ride sharing, or taxi self-driving car, by viewing the car's, and glasses' location on the map. The map can be an internet map which shows streets, and buildings, and environmental information. The user can move to the car, and view the glasses icon's location moving, in real time on the map. The user can view their progress toward the car, as the map updates the glasses' location on the map.

The touch screen has a route software, which augments the map, by showing a line, that is displayed on the map environment, and viewable by the user. The line is followed to reach the device. The route is pinned to the map environment, as the user walks, or cycles a bicycle, motorcycle, or rides in another self-driving car.

The route in the environment, is the same as the map route, and follows the route, that is displayed on the map. The user can follow the route line to reach the car's destination.

After Finding the Ride Sharing Self Driving Car

When the user finds the communal car, the glasses connects the cars computer, when the user is within 14 meters to the car.

The user unlocks the car door, using the by transmitting the user's identify information to the car, and personal identification number, or password. The user touches the ride sharing self-driving car icon which opens a door unlock screen the user is asked on the screen for their pin number. The car icon A keyboard is partially displayed on the unlock screen, the user touches each number of the pin into the pin, in this case the user's pin is 7314. The user opens the car door, the user enters the car.

When the user is, inside the community car, the user unlocks the cars locked ignition, by transmitting the user's identify information to the car, and personal identification number, or password. The user touches the car icon which opens a screen in mid-air. Each of the car icons has a description associated to the icon, each description describes the icon that it is associated to, like, a 5-passenger car.

The user is asked on the screen for their pin number. A keyboard is partially displayed on the unlock screen, the user touches each number of the pin into the pin, in this case the user's pin is 7314. Which starts the car. The user wants to go to a vending machine, vending machine is typed into search with. Touch of vending search shows vending machines on map.

A control panel is displayed, by glasses' mid-air touch screen. The control panel shows different operations of the car. Each operation is activated by touch of the operation. Each operation describes a different operation of the car. The activated operation activates the operation of the car that the activated operation of the describes. The activated the operation of the car, influences the operation of the car. The influenced operation of the car is shown on the display.

The user touches the display, with a finger, hand, or a pen held in the user's hand, while the glasses are on their head, and looking through lenses, in the glasses, which creates the mid-air display. The glasses and user are inside of the car. The glasses are a portable computer, with a mid-air display.

The touch screen detects a user's fingers, when they touch the glasses' display, as shown in FIGS. 5, and 6. The display 1446 shows, car input buttons, such as, start car, stop car, a fan speed increase, or decrease, a heat temperature thermostat increase. or decrease temperature, and an interactive internet map. Radio on or off, frequency modulation am, or fm.

The glasses computer connects to a global positioning system GPS device, in the glasses. The map knowns the glasses location. The map is used, for the user to request the car travel, to a chosen destination on the map. The map displays the cars location with a car icon on the map. The map can be used to find the car, by using the map to follow a route to the car.

The glasses computer has car operating software, glasses computer operating software, and mid-air touch screen operating software. The glasses computer operates the car, or connects to car computers that operate the car, operates the display, and operates the touch screen.

The glasses computer operates the car, the display, and the touch screen. The glasses computer communicates with the car computer. The car computer operates the car. The car computer, and glasses computer can connect to each other through an internet, with the car connected to the internet, and the glasses connected to the internet.

The car icon is connected to an internet address of the car's control panel, user menu components. The car control panel to be sent over the internet to the glasses, by the activation of the car icon. The glasses operate the car over the internet.

Also, the connection of the car and glasses computers can be through radio waves, with the activation of the car icon, by the user, associated to activating a request to send the control panel to the glasses by using radio waves. The glasses operate the car. by sending operating instructions to the car, thru the radio waves.

The computer has car operating software, computer operating software, and touch screen operating software. The computer operates the car, the display, and the touch screen. The glasses computer communicates with the car computer. The car computer operates the car.

A Displayed Map

A map is part of the glasses, with the locations of the glasses, and device shown on it. The map is displayed on the glasses display, with the locations, of the glasses, and car. The map displays the relationship of the location of the glasses to the car, and distance between them.

When the glasses, and car are at a distance on the map, the device, and glasses connect with each other through the internet. The car sends its virtual control panel to the glasses. The control panel is displayed by the glasses.

The user operates the car, by inputting into the car's control panel. The inputs into the car control panel, are sent to the car. The car uses the received inputs into its control panel, to effect, influence the operation of the car. The influenced operation of the car is sent to the glasses. The glasses display the influenced operation of the car. Like, a start car follow route icon, is touched, the car starts following a displayed route, the route icon lights up.

Car's Devices

The car's devices can include, a radio, climate control temperature, head lights, interior lights, ignition on or off, air fan speed, air venting defrost or feet warming, movies for passengers, computer games for passengers, engine temperature, oil warning light, and seat belt off warning.

The interface includes car device components commands, such as, radio station search, pre-set radio stations, increase or decrease radio volume, heat increase or decrease, fan speed increase or decrease, windshield wipers on, wiper speed increase or decrease, internet map, headlights on, and headlight low or high beam.

The radio icon interface 1406 includes, a change graphic radio number station indicator 1124, a change radio station increases 1426 or decrease icons, a sound volume indictor low 1416, and high volume 1418, a switch to another device switch 1412, like, headlights, or heater temperature, sound volume increases 1420.

The vehicle is equipped with, and connected to the car's computer, pedestrian or vehicle detection sensors, radar, and vehicle cameras and sensors (not shown). Car instruments can be displayed by icons, such as, speedometer, engine revolutions, engine oil alert, and engine temperature alert.

Different Way the Cars Control Panel can be Uploaded to the Glasses a) The community car's control panel can be automatically uploaded from the car to the glasses over the internet. The upload can be set to be distance activated, such as, the control panel uploaded when the glasses are 24 meters from the car. The control panel shown by a short cut on the glasses that describes the cars control panel. The touch activation of the short cut icon, displaying the control panel. The car is found by the map showing the glasses' and car's location on the map. The map shows streets, and buildings.

b) The cars control panel can be manually uploaded from the car to the glasses over the internet, by the user touch activating a car icon on the map. The car is then operated by the glasses over the internet, with the touch panel. The car icon displays graphically, and or with word describing the car, so the user can identify what the icon represents.

b1) The touch activation of the car icon, activates an internet link to a download of the control panel to the glasses, which downloads the control panel to the glasses, and the glasses displays the panel.

b2) The touch activation of the car icon, activates an internet link to a displayed web page, showing the car control panel on the glasses. The user touch operates the car, by touching displayed operations commands for the car, on the web page. The web page shows information about the car, such as, how much gas in the car, if available for use, and if its reserved by other users.

b3) The touch activation of the car icon, activates a web page showing a touch internet link to a displayed web showing the car control panel on the glasses. The user touch operates the car, by touching displayed operations commands for the car, on the web page. The web page shows information about the car.

b4) The activation of the car icon, activates a web page showing a touch internet link to activating an internet link to a download of the control panel to the glasses, which downloads the control panel to the glasses, and the glasses displays the control panel. The web page shows information about the car.

c) The car's control panel can be manually uploaded from the car to the glasses over the internet. By the user touch activating a car icon on the map. The car is then operated by the glasses by using radio waves, with the touch panel. With the glasses connected to the car with radio waves.

d) The cars control panel can be automatically uploaded from the car to the glasses with radio waves. The upload can be distance activated, 46 meters, which is determined by the glasses and car being within radio range of each other, such as, a Bluetooth connection established at 30 meters, or WIFI direct connection maybe 35 meters, from each other.

The uploaded control panel shown by a short cut on the glasses, describes the cars control panel. The touch activation of the short cut icon displays, the control panel. The car is found by the map showing the glasses' and car's location on the map. The map shows streets, and buildings.

e) The uploaded control panel is saved to the glasses' storage. When the glasses detect the car, by either distance on the map, or the automatic connection using radio waves. The glasses' first checks its storage, to see if the cars control panel is saved in the storage. If the panel is found in the storage, the icon short cut in the glasses, shows the car's control panel, is available for touch activation. The found stored panel, can also be automatically displayed.

The activated control panel and car each have a unique identifying computer code, that allow the car computer, and glasses computer, to assure the control panel, is the right control panel for the car, and is used for the matching car and glasses with each other. If the control panel doesn't match the car, the control panel won't function with the car.

The car computer, and glasses computer can each have their data encrypted, to limit other users from viewing their communication, to limit hacking of the car or glasses, and to limit operation of the car by other users' glasses.

f) The car control panel is activated from its saved space in the glasses storage, when the user touch activates the car icon on the map.

The activation of the car icon activates the computer to check in the storage to see if the control panel for the car is there, if it is, it uses the stored control panel, and doesn't download the control panel. A up to date software check by the panel, by glasses, or car, determines if the control panel is the latest up to date software, if it is the newest, it is downloaded to the glasses from the car, or from glasses to car. The control panel isn't downloaded again, if it had the latest car panel, and or doesn't over write the same stored control panel.

The car and glasses can communicate with each other, either over the internet, with radio waves, infrared light waves, or a combination of the communication ways, like, transmit over the internet, and receive using radio waves.

On the Map the Car can Graphically, and or with Words Show that its Available to be Operated by Glasses Connecting Through Different Company's Servers 1. The devices, and glasses can connect to each other, through different company's servers, with the different servers connecting to each other thru the internet. 2. The devices, and glasses can connect to each other through a single company's servers. 3. The devices, and glasses can connect to each other through both, the many of the devices, and glasses connected to different company's servers, and with many of the devices, and glasses connected to one company's server. With the one company's servers connected to many other companies' servers. With the different servers connecting to each other thru the internet Voice Recognition A microphone is part of the glasses', and connected to the glasses computer, and positioned to detect the user's spoken words. Words spoken, by the user, can activate the displayed icons.

The user can verbally, input one of the input icons, device location icons, or letters of the display menu, by verbally describing one or more of the displayed input icons, or letters. Voice recognition software in the computer, detects the icon being described, such as, saying increases volume, activates a sound volume increase icon. The sound volume increase icon is associated, to increasing a sound volume, of a radio in the car.

The glasses have a map. The glasses a voice recognition software, the glasses detect voice names of devices, detected voice names of devices are inputted into the search function, the glasses' detection of the user's voice description one of the displayed devices connects the described device to the glasses, the displayed operations are activated by a detection of an operations voice command by the user.

Thought Input

A thought input device is worn on the user's head, and connects to the glasses' computer, using radio waves, or wire. A thought input device software is in the glasses' computer. The user uses their mind to think about, and highlight the command they want to activate, such as, the increase volume for a predetermined amount on time, such as, 0.4 seconds highlights the increase volume. At 0.6 seconds, of continuous though, and 0.2 seconds past the highlighting, the increase volume command is left clicked, and the increase volume icon is activated. The activated increase volume icon increases the volume of the radio in the car.

The glasses have a brainwave software, and connects to the brainwave device worn on the user's head, devices are inputted into the search function using a search function thought command. The glasses' detection of the user's brainwaves, thought description of one of the displayed devices connects the described device to the glasses. The displayed operations are activated by a detection of an operations thought command by the user.

Eye Input

The glasses have an eye gaze sensor, camera, that detects the gaze of the users at input icons on the glasses, to activate the gazed at icons. The camera views the user's eyes. The glasses' computer has eye gaze software.

The user looks, gazes at the glasses display, a cursor follows the gaze point on the display screen, letting the user see what their gazing at. The user gazes at one of the icons for 0.1-0.8 seconds, and the icon is left clicked, and activated. A timer can be displayed, showing how much time of gaze is left, until the icon is activated.

User Finds a Ride Sharing Self Driving Car by Using a Map

The user can find a car's location, on a map. A touch screen glasses are connected to a blue tooth or Wi-Fi radio device transmitter and receiver. A car's devices are connected to a blue tooth or Wi-Fi radio device transmitter and receiver device. The glasses connect wirelessly to the car's devices, when the glasses are within 5 meters or more to the car, and when the driver is in the driver's seat.

The ride sharing self-driving car has software operating instructions icons, for the various functions and devices of the car. The car instructions are displayed on a menu by the touch screen.

The menu is on the glasses' screen. The taxi self-driving car's devices can include, climate control temperature, head lights, interior lights, ignition on or off-air venting defrost or feet warming, movies for passengers, engine temperature, oil warning light, and seat belt off warning. Car instruments can be displayed by icons, such as, speedometer, engine revolutions, engine oil alert, and engine temperature alert.

The glasses' screen shows a user interface. The glasses can be placed on the car dash board 1408 when not in use, and within distance of driver or passenger. The interface includes car device components commands, such as, radio station search, pre-set radio stations, increase or decrease radio volume, heat increase or decrease, fan speed increase or decrease, windshield wipers on, wiper speed increase or decrease, ground positioning system map, headlights on, and headlight low or high beam.

Internet Connection

The glasses connect to the internet. While the public car is driving to a destination, the user can surf the internet on the glasses, view internet web pages, stream and watch movies, videos, tv, listen to music, internet radio, and play online internet games.

The car can have a car display connected to the car computer. The car computer connects to the internet. The glasses' display is cloned, shown on the car display. The glasses operate the car display.

User Finds a Car by Using a Map

The user can find a car's location, on a map. A mid-air touch screen glasses are connected to a blue tooth or Wi-Fi radio device transmitter and receiver. A car's devices are connected to a blue tooth or Wi-Fi radio device transmitter and receiver device. The glasses connect wirelessly to the car's devices, when the glasses are within 5 meters or more of the car, and when the driver is in the driver's seat.

The car has software operating instructions icons, for the various functions and devices of the car. The car instructions are displayed on a menu by the touch screen.

Icons are Transparent

The icons being transparent. Objects can be seen thru the icons. The user can adjust, the level of transparency. Each devices control panel can behave a customized theme to what the user like, such as, a green color theme, or travel destination pictures. The user may feel more connected, to a mid-air touch display control panel, where they have input into its design, then a devices physical control panel, like, an Atm's physical control panel, where the user has limited input, into the physical panel's design.

Three possible, user set setting for activation of icons, with finger contact with the icons, Touch of an icon, highlights the icon. further movement of finger of the highlighted icon, activates the icon. Another possible activation way, is continued contact with the highlighted icon for a time period activates the icon. Another possible activation way, is the icon is activated on first touch, contact of the finger with the icon.

Menu Help Instructions

A help icon, labelled help can, be displayed, that when touch activated displays instructions on how to operate, the find and operate a device system, such as, explaining how to touch a device's icon to display the device's control panel, which displays its different operations which are touch activatable.

Glasses Self Driving Car Operation

Request Self-Driving Car Move to User's Location

The user calls the car, and it drives to the user's location, by itself without a driver, the car might be void of people, shown, in FIGS. 5, and 6. The user types in available self-driving car in the search box. The locations of the cars, are shown on the map. The user touches the car they want. An information box shows the cars information, make, model, year, like, Chevrolet, Malibu, 2018, how much it costs, per kilometre, and time, like, 0.20 kilo, and or 8 hours. The cars are available, for the general public, or possibly by a membership, that enables access to the cars.

A box shows, call car, the use touches the call car. The car proceeds to the location of the user which is shown on the map, and parks as close as possible to the user. If the user is going to wait at the location, the user can request the car park to a location picked by the user. The car proceeds to the location the picked by the user, and inputted into the map, by inputting the address, or touching a spot on the map, user which is shown on the map.

The glasses have a holographic control panel input display 1404, on the glasses. The map shows the user's present location 1434 on the internet map 1432. The present location is shown by a figure, such as, a circle.

The user touches a point on the map 1402, and the touch creates a location 1444, on the displayed map, that the user wants the car to move to. The move to location is highlighted with a visual, clue, such as, a dot, a flag, or a cursor point 1444 on the display. The user can move the dot to another location, by activating the dot to follow, the touch to the other location.

The map has a search icon 1448, The touch activated search icon opens a search window. In the search window, is typed building addresses, names of business, names of locations. The found locations are displayed on the map. A voice icon 1446 announces the glasses location. A compass icon 1430 points to the north.

The user can type in a start location, and a destination location, and different routes will be shown between the two locations. The user is shown one or more, alternate routes 1438, to the desired location. The user touches the route the user desires. The displayed chosen route 1436 is highlighted. A start travel icon 1440 is displayed. The user touches the start travel icon 1440, and the car operation starts travelling the route. A stop travel icon 1442 is displayed. The user touches the stop travel icon, and the car parks safety out of the way of traffic.

The MR glasses have a mid-air touch display. The user can touch input, the displayed input icons for the self-driving car, by touching the icons on the screen. The user touches the start to destination icon, to activate the start to destination icon. The activated start to destination icon, signals the car's computer, to proceed to the location of the destination icon.

In another embodiment, a thought input device is wirelessly connected to the glasses and connected to the computer in the glasses. The user can also use though to activate the desired route. The user thinks of the route the user desires. The displayed chosen route is highlighted. The start travel icon is displayed. The user thinks of the start travel icon, and the car starts travelling the route. The stop travel icon is displayed. The user touches the stop travel icon, and the car parks safety out of the way of traffic.

Safe Car Operation

If a pedestrian or vehicle is detected to close to the car, or on a course where the pedestrian or vehicle may contact the car, the pedestrian is highland on the display. The car automatically avoids contact with the pedestrian, object, or other car, by either stopping the car, or moving the car out of the way of the hazard. Hazard avoidance software is part of the car computer, and uses artificial intelligence software to aid in hazard avoidance. The intelligence software learns to improve the cars obstacle avoidance, as the car is operated over a time period.

The pedestrian or vehicle is viewable with a red flashing outline, halo around the pedestrian. The highlighting allows the driver, to act to avoid possible contact, with the pedestrian or vehicle. The pedestrian or vehicle is detected by sensors, radar, pedestrian or vehicle cameras and sensors in the car (not show).

If the computer doesn't avoid the hazard, the user may manually avoid it. The pedestrian or vehicle is viewable with a red flashing outline, halo around the pedestrian. The highlighting allows the driver, to act to avoid possible contact, with the pedestrian or vehicle. The user can look at the stop car icon to turn off the car in an emergency. The pedestrian or vehicle is detected by sensors, radar, pedestrian or vehicle cameras and sensors in the car (not show), which are connected to the car computer.

The user can turn on the head lights by touching the turn on head lights icon. The user's finger's contact with the light icon is detected by the touch screen, and connected computer. The computer activates the turn headlight on function. The computer sends instructions to the headlights switch to turn on the headlights. The light switch is switched to the on position, the lights are turned on.

The car broadcast radio waves that it is available to have its control panel menu down loaded. The glasses receive the broadcast and downloads the menu. The touch screen displays the menu on the display. The glasses and car are connected wirelessly and transmit and receive information with each other.

A user can set the glasses, too automatically, or manually, connect to the car. When the glasses connect to the car, the display menu for the car is transmitted to the glasses. The received car control panel menu is display in for the user to view, and input in to.

The user can change the location that the input display is positioned. The display location can be a location which is convenient for the user. The menu in the control panel is at a location which is touch accessible by the user, such as, 0.5 meters in front of the user. The user touches the different input commands for the car, such as, turn on or turn off lights.

The user touches the command they want to highlight, and activate, to highlight the command they want activated. The user uses their touch to activate the command they want activated.

The user touches with their fingers at the command they want to activate, the command is clicked, by touch and the command is activated. The user can active another command after the first command is activated. The user can active another command after the first command is activated.

When a car icon is activated, the car transmits to the glasses, that the icon is activated. The car sends data about the status of the activated device, such as, speed of the car. The data sent from the car is displayed on the on the glasses' screen display. The displayed data keep the user informed about the car's operation, and interaction with the user. The user can use the displayed car data to adjust the operation of the car, such as, changing the speed of the car.

Touch input of one of the icons, by the user's finger, inputs a request to the computer. The computer directs the car to carry out the input request of the user. For example, the user touch enters an input icon. The enter input is detected by the sensor and the computer. The computer directs the car use the light's high beams.

Automatic Parking

The car parks at the location, picked, and uses cameras in the car to view displayed parking signs, which may restrict when the car can park, like, no parking on Mondays. The car wont park where signs say not to park, and will search for a parking space that is allowed parking. If its ok to park the car parks, as close to the picked location as possible.

Radio Operation

The user can touch the number the radio station the radio is tuned to, to change the radio station to the number the user desires. The user can change the station, by touching the radio station change station increase, or decrease icons, which increases, or decreases the station tuning number. The user can switch between the radio receiving amplitude modulation AM, and frequency modulation FM radio waves, by touching the change car component symbol, which will change to FM, or AM The user can increase the volume of the radio, connected to the glasses, by touching the volume increase operation icon 1420, which increases the sound volume from speakers in the car, or decrease volume symbol of the radio by touching the decrease volume symbol icon 1422, as shown in FIGS. 5, and 6. The can view the volume of the radio on the volume indicator icon. The user can view a number icon 1424 of the radio station the radio is tuned to. The user can change the station, by touching the radio station change station increase or decrease icon 1126. The user can switch between the radio receiving amplitude modulation AM, and frequency modulation FM radio waves, by touching the change car component symbol icon.

When the change component icon is touched, it goes to the next component, and displays the components icon interface. Other components include, climate control heat, and head light brightness. The change icons image changes, to represent the competent is use, such as, a musical note symbol is shown when the radio is on, or a light bulb is shown when the lights are chosen for input.

Head Lights

The user can turn on the head lights by touching the turn on head lights icon with their touch. The user's touch contact with the light icon, is detected by the touch screen, which is connected to the computer, in the glasses, and the glasses computer is connected to the car computer by radio waves. The computer activates the turn headlight on function. The computer sends instructions to the headlights switch to turn on the headlights. The light switch is switched to the on position, the lights are turned on.

The user can keep or remove different devices control panels, to lessen the number of control panels viewed, with touch. The icons can be used for different devices, by changing the components the icons are associated to. The change to another device switch of the input icons is used to switch or toggle between the different components. For example, the icons may be used in the operation of the radio, the user can switch their association to a next component, such as, the operation of a ground positioning system GPS map display, or the air heating system.

The icons can remain continually displayed, or can be turned on and off, by the user using their touch to contact, a turn off, or turn on, on a turn on off icon.

Finding and Operating a Multiuser Device with Glasses Map Description

MR Glasses, have a mid-air finger tracker. The glasses allow a user, to use touch, to activate mid-air input icons displayed by the glasses' display.

The finger tracker sensor, tracks a user's touch of input icons, as they view the and finger's contact with the input icons. When the fingers and icons are in the same mid-air space, it is a finger touch of the icon. The finger tracker is positioned in the glasses, to view the user's finger's touch of the input icons.

The glasses computer is programmed, with a touch software. The glasses use the touch display, to operate the touch display external device's operating panel. The panel is displayed by the glasses. The glasses display images, that the user touches.

The Icons can Operate Different Functions

The icons can operate different functions, such as, an internet operation, a device operation, or computer operation. A browser input icon is used in internet operations, to display a search web page.

Input icons are displayed on the displayed web page, such as, an internet search operation. The search operation is used to search, the internet. The user types into the search operation, information requested by the user, and activates the search operation. The results of the search are displayed.

The icons show computer functions, such as, an center' input, or command. A word document can be shown, that the user types words into, and edits the words. The icons show device functions, such as, a toilet' icon, which is used as part of an electronic bidet in a toilet.

A Displayed Map

A map is part of the glasses, with the locations of the glasses, and devices shown on it. The map is displayed on the glasses display, with the locations, of the glasses, and devices. The map displays the relationship of the location of the glasses to the device, and distances between them.

When the glasses, and device are at a distance on the map, such as, 25 meters to 65 meters, the device, and glasses connect with each other through the internet. The device sends its virtual control panel to the glasses. The control panel is displayed by the glasses.

For example, the user is close to an automated teller machine ATM, like, 20 meters. An icon is displayed that the Atm can be operated, on the map. The Atm icon is activated by touch. The Atm control panel is displayed on the display. The control panel displays inputs, such as, deposit, withdrawal, a 1-10 number pad, enter, change, and cancel, etc, can be touch activated.

The user inputs a deposit input, using touch. The deposit screen is displayed. Touch inputs 11 dollars, by touching, at the numbers 11 on the mid-air number pad consecutively. The 11 is displayed. Touch activates the enter input. The 11 dollars of currency is deposited, and accepted by the Atm, and the acceptance is displayed by the glasses. The user ends the session with the Atm, by using touch, to activate a log out input.

The Device Displayed on the Display with a Short Cut Icon

A short cut icon on their glasses, displays the device that can be activated, by the activation of the icon. The short cut describes the device, graphically, and or with words. The device maybe the closest device to the glasses. The device displayed by the icon as the closest device changes.

The Control Panel is Saved to the Glasses

The control panel is saved in the glasses' storage. The next time the device's control panel is activated, the control panel is activated form the storage.

Updating of Device Control Panel

The glasses communicate with the device, to see if the stored control panel is up to date. By seeing if it's the newest version of the panel. If the device has a newer version of the panel, the newer version is downloaded to the glasses, replacing the less new version. The less new version is sent to the delete folder. The new version is used to operate the device.

User Finds the Car

The user can find a self-driving car's location, on the map. After finding the car, the user enters the car. When the user is, inside the car, the glasses connects wirelessly to the car's computer.

The user wants to go to a vending machine. The user types vending machines in the maps search area and enters, the vending search. The glasses search for vending machines on the map. The vending found on the map are shown.

The user choses one of a multiple of displayed vending. The user touches an icon representing the chosen vending on the map. The user's touch of the icon, actives the vending icon, and the ending is icon is highlighted, showing the user that it is activated, and no longer needs to be touched. A displayed directions icon is touch activated. The activated directions show different routes to the machine. Touch then actives a chosen route. The user touches at a displayed start car route icon. The route icon is activated.

The map can show the vending's location, in a building, and show a route to the vending in the building. For example, the vending is on the number 2nd floor, routes are shown, to either take the elevator, or stairs to reach the vending on the 2nd floor.

The Device May not be Connected to the Internet

The device may not be connected to the internet. The non-internet device is shown on the map. The user finds the device by following a route on the map to the device.

The non-internet device connects to, and communicates with the glasses wirelessly, using Bluetooth, or WIFI direct. The glasses receive the devices control panel from the device. The glasses operate the device with the received control panel.

In another embodiment, the devices control panel can be received over the internet, by touch activating the devices icon on the map, or device icon on the display. The received panel is sent to the glasses over the internet, and the glasses operates the device using radio waves.

Manual Connection to a Device by Glasses

The glasses connects to the device, thru the device's web page. The devices on the map have an internet link to a control panel for the device.

The device's location is shown on the map, with an icon representing the device. A name, or description, which describes the device's icon, such as, smart toilet, or elevator.

The icon is activated by touch. The activated icon shows a map window. On the window is displayed an internet link to the device's control panel. The window can give more information about the device, such as, how many users are using the device.

The link is described as, the devices control panel. The link is touch activated, and the control panel for the device is displayed. The control panel show different imputable operations for the device, with input icons. The user operates the device, by activating the input icons, with touch.

The link is connected to an internet address for the device. The device's internet address is managed, by the server that the device is connected to. The device connects to a router. The router connects the server that its specific to the device. The devices web page is managed, and or stored on the device's server. The device has a device computer. Information from the device is sent to the glasses, and information from the glasses are sent to the device.

The web page gives visual feedback, on how the activated functions of the device, influences the operation of the device. The glasses receive, and displays feedback, from the device, concerning the influence the activated device operation, has had on the device.

With some device icons, the activation of the icon, can open the control panel for the device, without showing the link of the device in a window. The devices on the map have the internet link, connected to their icon as a short cut to the link. Activating the device's icon displays the control panel for the device.

Down Loading the Devices Control Panel and Operating the Device with Bluetooth Radio Waves The device's web link is activated. The devices control panel is downloaded to the glasses, over the internet. The downloaded control panel is displayed with an input icon short cut to the control panel. The icon visually identifies, that it is an icon for the device. The icon is activated, and the control panel is displayed. The glasses connect to the device using Bluetooth or WIFI. The user activates the device's control panel input icons using touch. The activated icon operates the device.

Single Network for the Devices, and Manual Connection

The devices can use a single network. The manual connection procedure of the glasses, to devices can be used. The devices connect to the glasses, on servers of a single network, that can be operated by a company. The devices are connected to the network's servers. The network displays the map web page. The devices web pages, and devices information are stored on the network's servers.

The glasses connect to the network map, and devices over the internet. The glasses operate the devices by communicating with the devices thru the network's servers.

Map Search for Devices

The user can zoom into and out of the map, with touch. The map is a graphic representation of the area, with written descriptions, such as, streets, street names, buildings, names of points of interest, like, self-driving cars, parks, stores, restaurants, metro stations. The map can be a picture view, such as, an internet street view, of the user's glasses, and devices locations.

Devices Shown on the Map

Devices that can be operated by the glasses are shows at their locations, on the map, such as, self-driving cars, elevators, and store checkout pay machines. The devices can be identified, with a symbol or colour, to let the user visual identify the devices as being operable by the glasses.

The map can be searched for devices, with a search map engine. The user can search for devices on the map, such as, smart toilets, gas station gas pumps, with the search results shown at their locations on the map.

The server that the glasses are connected to, connects to the server that the device is connected to. The device, and glasses communicate thru the connected servers.

The device can limit the distance that the device can be operated, such as, 20 meters. If more than one user is using a single user device, for instance, at an ATM, the first user uses the device. The users are assigned a number in line, each user is shown the number, of their location in the line to use the ATM, such as, the number 3.

If the device is a multiuser device, like, an elevator, the first user's input, effects the operation of the elevator. The first user to input a floor number, is inputted, then the next detected user to input floor number, so the detected inputted floor numbers are recorded, and displayed consecutively.

Find the Device by Viewing the Device's Location on the Map

The glasses have a global positioning system GPS, and the device has a GPS. The position of the glasses, and device plotted on a map on the server, such as, an internet map. The map determines the distance from the glasses, to the device.

The user finds the device, by viewing the device's, and glasses' location on the map. The map can be an internet map which shows streets, and buildings, and environmental information. The user can move to the device, and view the glasses icon's location moving, in real time on the map. The user can view their progress toward the device, as the map updates the glasses' location on the map.

The touch screen shows a route, which augments the map reality, by showing a line, that is displayed on the map environment, and viewable by the user. The line is followed on the map to reach the device. The route is pinned to the map environment, as the user walks, drives an automobile, or cycles a bicycle, motorcycle, or self-driving car.

The route in the environment, is the same as the map route, and follows the route, that is displayed on the map. The user can follow the route line to reach the device's destination.

Example of a Touch Screen in Mid-Air with an Input Device Operating an ATM

The user touches the ATM with the name of the bank that operates it on the map, us an icon with a graphic symbol. By touch activating the icon, the name of the ATM, a description, of the services that the ATM provides, such as, deposit or withdrawal, the hours of operation, and its address, is displayed.

Devices can be shown such as, self-driving cars, elevators, vending machines, and store checkout payment stations. Each device is connected, to one of many servers. Each server is connected to the internet. Each device has an internet address, that is unique to the device. Each device has a web page that is specific to that device. The web page for one of the device's, displays the devices control panel. The page is interactive with the user. The user can operate the device, by touch, activating commands or different operating functions of the device displayed on the web page. The activated displayed operating function activates, is associated to activating, the operation of the device that is described by the operating function.

Glasses Connecting to the Devices Through the Internet

The glasses uses radio waves, to communicate wirelessly, with the devices. The glasses can communicate with the device through the internet. The glasses have a cell glasses transmitter and receiver, for connecting to a cell glasses tower.

The device connects to an internet router, either wirelessly, or wired. The device internet router connects, to a server for the device. The device server connects to the internet.

The glasses connect to a cell glasses tower. The tower connects to an internet router for the tower. The tower router connects to a web server for the tower. The tower web server connects to the internet. The device server connects to the tower web server, over the internet.

The device's server hosts the devices web page. The device, and glasses each, have a unique IP address (Internet Protocol address) to identify each other, over the internet. The addresses can be an IP address using IPv4 or IPv6. The Internet Protocol (IP) is the principal communications protocol in the Internet. A security software in each the glasses, and device. can secure the connection between the glasses, and device.

The device, and glasses may both use their own internet service provider ISP, to access the internet. The ISPs may be part of an internet exchange.

The glasses, and device communicate with each other over the internet, using internet protocol language. The communication between client, and server takes place using the Hypertext Transfer Protocol (XHTTP), The communication can use MQTT which is a protocol for machine-to-machine and Internet of Things deployments. The communication can use CoAP which is aimed at one-to-one connections.

The IP address identifies the host, or its network interface, and it provides the location of the host in the network, and the capability of addressing that host.

The glasses, and device each have a unique DNS (Domain Name System). The DNS turns the glasses, and device domain names into unique Internet Protocol (IP) address. The glasses, and device each have a communication software.

The glasses can connect to the internet, by connecting to a cell phone tower, with the glasses cell tower network connected to the internet. The glasses, and or device, or both broadcasts, on their respective servers, their availability to connect with each other. The glasses broadcasts, it's availability to connect to the device, and the device it's availability to connect to the glasses.

Finding and Operating a Multiuser Device with Glasses Map Operation

The mid-air touch displays detects where the user users touch on the screen. The touch screen detects when the user touches one of the icons. For example, the user touches, the enter input. The enter input is activated, and is highlighted. The activated enter input is used, to enter an input, for the glasses, or web page, or device.

A signal that the icon has activated, is sent to the device, to operate a function of the device. The device receives the signal to operate the function of the device. The device uses the received function signal to operate the device.

The glasses receive, and displays feedback, from the computer in the glasses, concerning the influence the activated computer function, has had on the glasses computer. The glasses receives, and displays feedback, from a computer in the device, concerning the influence the activated device function, has had on the device, like, user's touch of the icon, actives the icon, and the ending is icon is highlighted, showing the user that it is activated and doesn't need to try to continue to try to activate it with continued touch.

Glasses Operation of a Smart Toilet

The user can use the glasses, to control a smart toilet's electronic bidet. The user's touches the bidet icon, they want to activate. Touch of the icon activates the icon. The activated bidet icon signal is sent to the bidet device, to operate the bidet.

The touch screen detects the user's touch, at the bidet's increase water temperature icon. The timer starts in the glasses, at the detection of the touch, at the temperature icon, the detection of continued touch, at the temperature icon, the icon is activated.

The glasses send, the bidet the activated increase water temperature icon function. The bidet receives, the increase water temperature icon function. The increase water temperature function influences the operation of the bidet. The water temperature of a water stream from the bidet, is increased.

The glasses receive information from the bidet, that the water temperature has increased. The received water temperature increase is displayed, on the screen, and is viewable by the user.

The glasses have a mid-air touch screen display. The user can touch input, the displayed input icons for the bidet, by the icons on the screen.

The user touches the increase water temperature icon, to activate the increase water temperature icon. The activated start to increase water temperature icon, signals the bidet computer, to proceed to the increase the bidet's water temperature.

Alternative Embodiments

Figure 10:
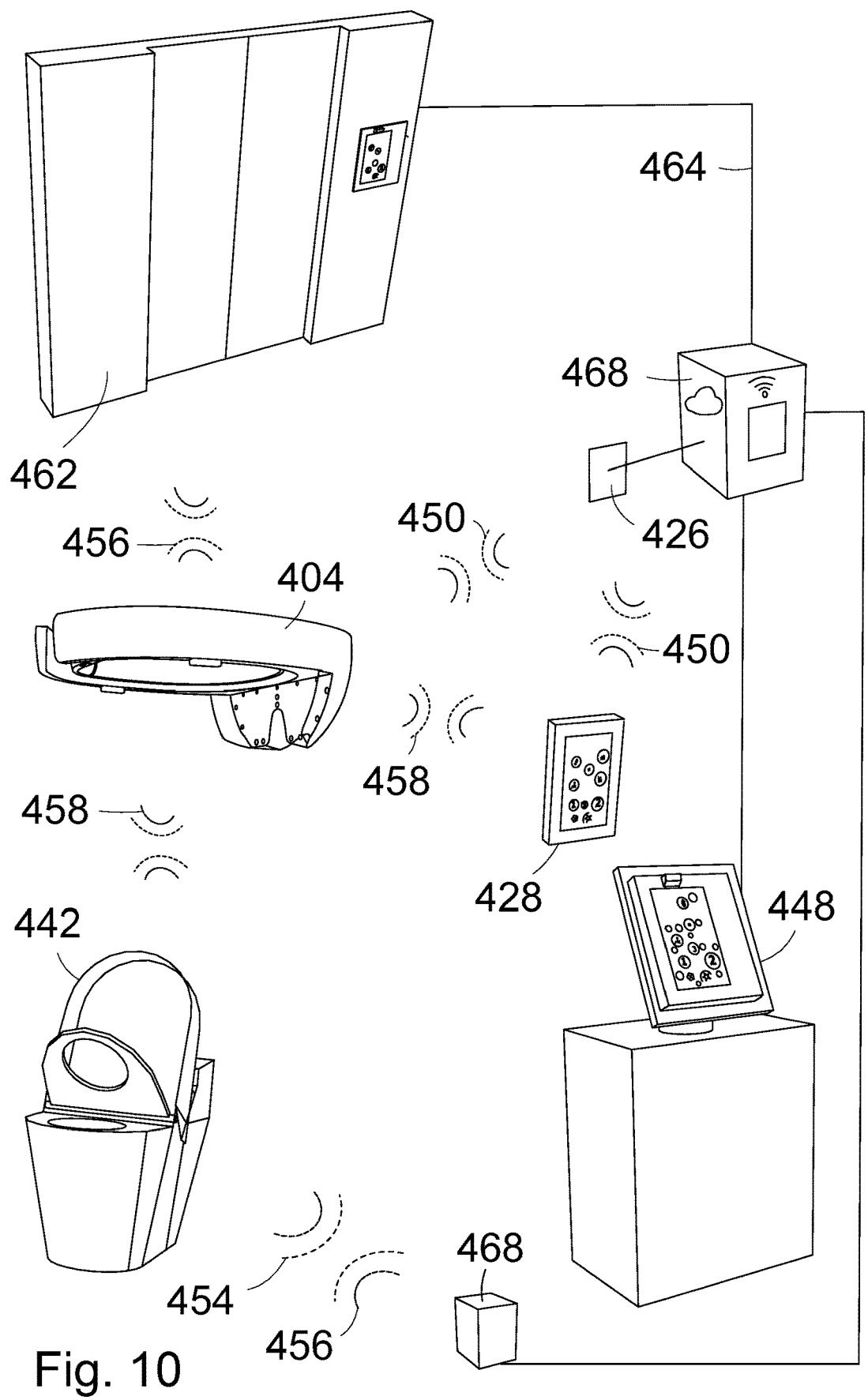
FIG. 10 shows a perspective view, of glasses, and its wireless connections to different public devices, including, a smart toilet, elevator, and medical devices.
Figure 11:
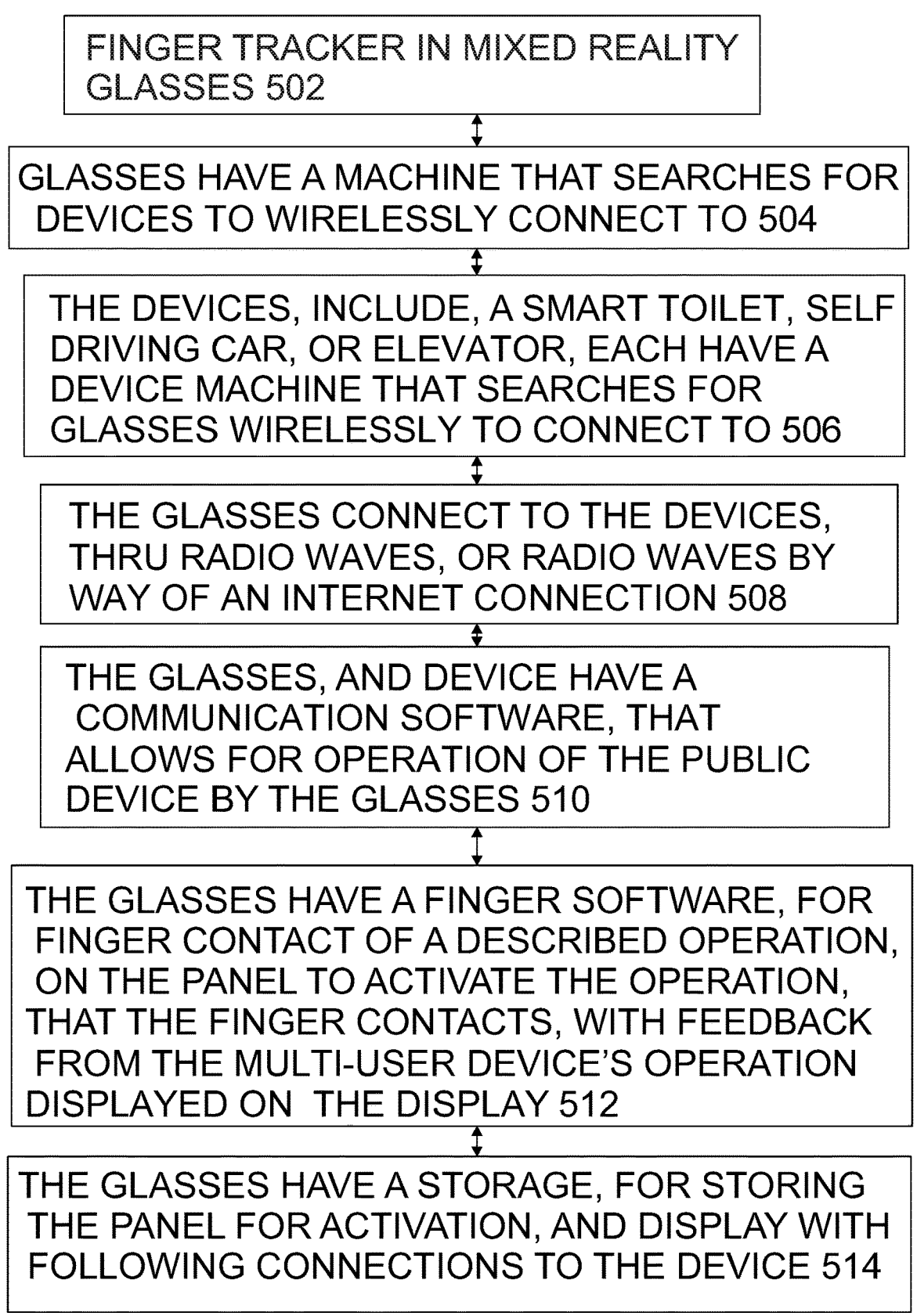
FIG. 11 is a block diagram of hardware connections, for the glasses, connection to multi-user public devices, like, a gas station gas pump, vending machine, or automatic teller machine.
Figure 12:
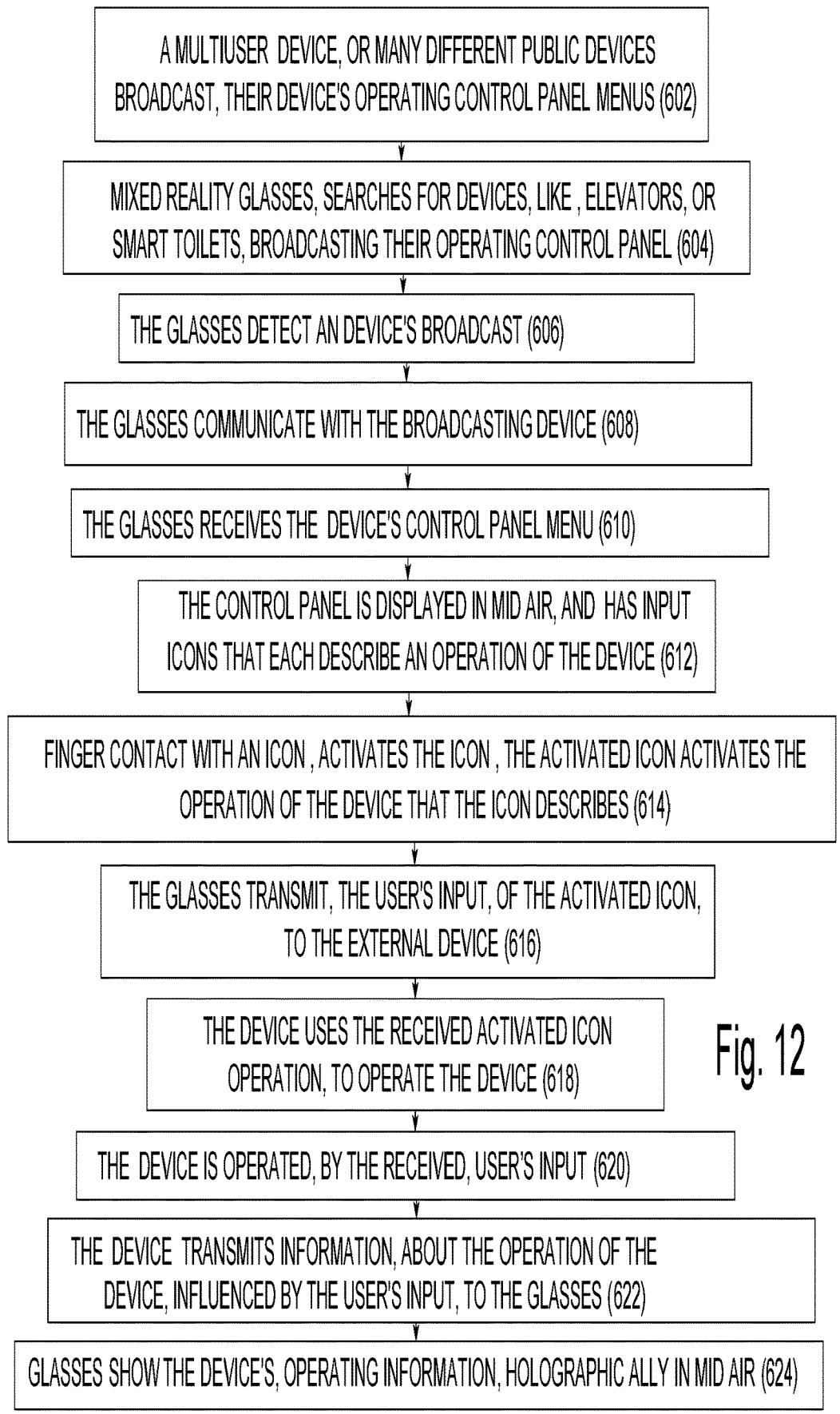
FIG. 12 is a software flow chart of hardware connections, for the glasses, connection to multi-user public devices, like, a flammable environment device, fast food restaurant order menu, or space station device.

Finding and Operating Different Devices Description
User Finds a Device by Using Map
The user can find a device's location, on the map, as illustrated in FIG. 10. Glasses uses a touch screen sensor, to track a user's touch. The touch screen is positioned in the glasses, to detect the user's fingers, as the user touches input icons, displayed three on screen.

The touch screen is connected to a computer, in the glasses. The computer is programmed, with touch screen software.

The glasses, portable computer displays images on a display, cover by glass that the user touches. The images create an optical view for the user. The input icons, menu items, control panel, graphical user interface, are displayed three dimensionally, and or two dimensionally 2D.

The Icons can Operate Different Functions
The icons can operate different functions, such as, an internet operation, a device operation, or computer operation. The browser input icon is used in internet operations, to display a web page. Input icons are displayed on the displayed web page, such as, an internet search operation.

The icons show computer functions, such as, an enter command. The icons show device functions, such as, an cony icon, which is used as part of a light switch, to turn on a light. The icon can enlarge with the touch.

A signal that the icon has activated, is sent to the device, to operate a function of the device. The device receives the signal to operate the function of the device. The device uses the received function signal, to operate the device.

The glasses 404 receives, and displays feedback, from the computer 404 in the glasses, concerning the influence the activated computer function, has had on the glasses computer.

The glasses receive, and displays feedback, from a device computer 104 in the device, concerning the influence the activated device function has had on the device.

Operation of an on Off Switch
For example, the touch screen detects the user's touch at the light's, on off switch, on icon. The on icon is highlighted.

Figure 7:
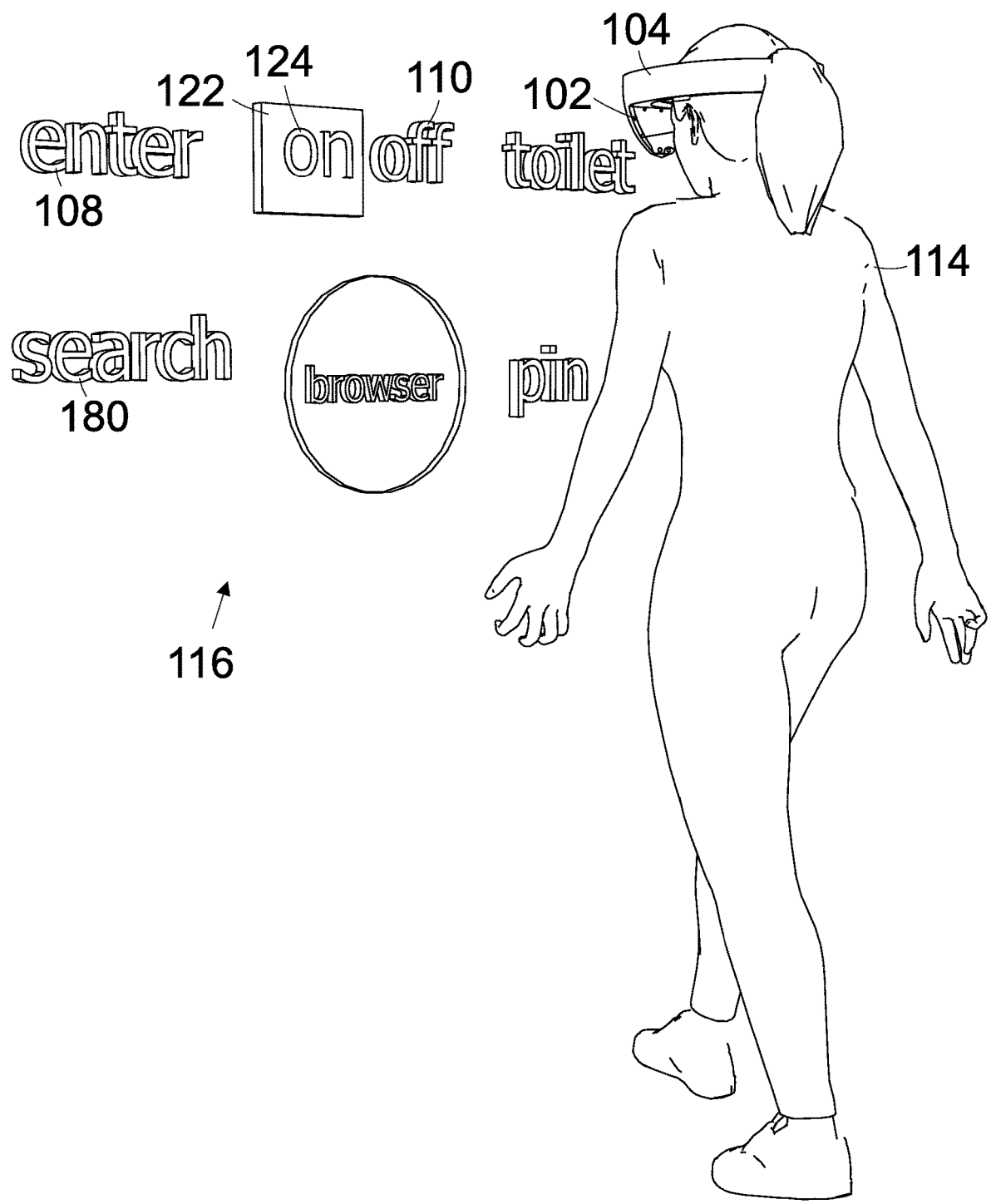
FIG. 7 shows a perspective view, of mixed reality glasses, with input icons, for a multi-user on off switch.

The on icon 124, as illustrated in FIG. 7, is inputted by the detection of the user's touch, of the on icon. The light is turned on, by the input of the on icon. The glasses receive information that the light has turned on, by the on icon changing color to a green colour. The glasses display that the light, has turned on by the icon being a green color.

Connection Between Glasses and Devices
The glasses may connect to and communicate to differing external devices, as illustrated in FIG. 10. The glasses use a radio wave connection between the glasses and the differing devices, and or an internet connection between the glasses and the differing devices.

The glasses can connect to devices, with the glasses having a wireless connection to the internet, which can include, microwave cellular connection 450, to 4G, or 5G cellular towers 426, a WIFI connection 454 over a local Area Network (LAN) 456, Direct WIFI, Infrared light, and Bluetooth radio waves 458.

The glasses having radio wave transmitters, and receivers for each radio connection system. The devices having radio wave transmitters, and receivers for each radio connection system.

The glasses and the devices can also communicate using infrared light. The glasses having infrared light wave transmitters, and receivers. The devices having infrared light transmitters, and receivers. The glasses can connect to the internet, thru a WIFI router 468. With the glasses router being connected glasses server 468, and the glasses server is connected to the internet.

The devices can connect to the internet, thru a router 468, and modem. The device router being connected a device server, and the device server is connected to the internet. The devices can use a wireless, WIFI, or wired connection to the router.

The glasses, and device can connect to cell glasses towers 426 using cell glasses radio waves, or microwaves 450. The glasses can access the internet, thru the glasses' connection, to the cell glasses towers.

The devices that connect to the glasses 404 can connect to the glasses having a wireless or wired connection to the internet, which can include, microwave cellular connection, to cellular towers, a WIFI connection over a local Area Network (LAN), Direct WIFI, Infrared light, and Bluetooth radio waves. The glasses having radio wave transmitters and receivers for each radio connection system. The devices may include an elevator 462, the smart toilet 442, and a medical device 448.

Establishing a Connection Between Glasses and Devices
The glasses broadcasts that's its available for communication with a device, as illustrated in FIG. 10. The glasses search for devices that are broadcasting, that they are available to communicate with the glasses.

The device broadcast that's its available, for communication with the glasses, and searches for glasses that are broadcasting that they are available with the glasses. When the glasses, and device are in radio wave connection range with each other, they connect, and communicate with each other.

External devices broadcast their control panels, to different glasses. More than one glasses can operate a device, such as, many user's glasses can input into the elevator control panel, at the same time.

When the user's glasses, is near the external device. The external device's control panel icon is shown on the glasses' display. The control panel icon indicates that the external device's control panel, it's available for downloaded to the glasses computer.

When the external devices control panel is activated, the external device's control panel is download, to the glasses' computer, and is shown on the glasses display, and stored in the glasses storage, for activation when the glasses connect to the device again An Internet Connection Between the Glasses and Device
The glasses can connect to external devices using the internet 464, as illustrated in FIG. 10. The device broadcasts over the internet that its available for operation.

The glasses computer's location can be found using the glasses' global positioning system GPS, or glasses cell glasses location, etc. The glasses can be located on an internet map. The map includes the external devices locations on the map. The devices, such as, a vending machine can communicate with the glasses, connecting with glasses using an internet connection, using internet communication, and communicating over the internet.

The glasses can be located on the map. The map shows the plotted locations of the different external devices' locations. The glasses, and devices each have a location software that allows them to know each other's location on the internet map.

The glasses' computer, and external devices location can be tracked and plotted, on the internet map, to determine when the glasses are near the devices. The map is displayed and viewed by the user Storage The computer readable medium may include non-transitory computer readable medium, for example, such as computer-readable media that stores data for short periods of time like register memory, processor cache and Random-Access Memory (RAM). The computer readable medium may also include non-transitory media, such as secondary or persistent long-term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

These computer program instructions may also be stored in a computer-readable medium that can direct a computer or other programmable data processing apparatus, to function in a manner, such that the instructions stored in the computer-readable medium produce a function of a device, including instructions which implement the function act specified in the flowchart and or block diagram block or blocks.

The computer program instructions may also be loaded onto a computer, or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram.

Software Flowchart

Software flowchart of the glasses, and devices. A multiuser device, or many different public devices broadcast, their device's operating control panel menus (602), mixed reality glasses, searches for devices, like, elevators, or smart toilets, broadcasting their operating control panel (604), the glasses detect an device's broadcast (606), the glasses communicate with the broadcasting device (608) the glasses receives the device's control panel menu (610), the control panel is displayed in mid-air, and has input icons that each describe an operation of the device (612), finger contact with an icon, activates the icon, the activated icon activates the operation of the device that the icon describes (614), the glasses transmit, the user's input, of the activated icon, to the external device (616), the device uses the received activated icon operation, to operate the device (618), the device is operated, by the received, user's input (620), the device transmits information, about the operation of the device, influenced by the user's input, to the glasses (622), glasses show the device's, operating information, holographic ally in mid-air (624).

Block diagram, of hardware connections, of the glasses, and devices. Finger tracker in mixed reality glasses 502, glasses have a machine that searches for devices to wirelessly connect to 504, the devices, include, a smart toilet, self-driving car, or elevator, each have a device machine that searches for glasses wirelessly to connect to 506, the glasses connect to the devices, thru radio waves, or radio waves by way of an internet connection 508, the glasses, and device have a communication software, that allows for operation of the public device by the glasses 510, the glasses have a finger software, for finger contact of a described operation, on the panel to activate the operation, that the finger contacts, with feedback from the multi-user device's operation displayed on the display 512, the glasses have a storage, for storing the panel for activation, and display with following connections to the device 514.

Computer

The computer in the external device, is used for processing, and implementing the information received from the glasses, concerning the user's operation, and input of the device's operating menu on the glasses. The received user input information, by the external device, is used in the operation of the external device.

The computer may further include on-board data storage, such as, memory coupled to the processor. The memory may store software that can be accessed, and executed by the processor, for example. The host may be any type of glasses computing device, that is configured to transmit data to the device. The host and the device may contain hardware, to enable the communication link, such as processors, transmitters, receivers, antennas, etc.

Communication Links

The glasses may connect to the device, locally, over a network, or at a distant location over the internet. In the communication link is illustrated a wired connection, however wireless connections may also be used. For example, the communication link may be a wired link via a serial bus such as USB, or a parallel bus. A wired connection may be a proprietary connection as well. The communication link may also be a wireless connection, such as Bluetooth, IEEE 802.11 or other wireless based communication links. In another example, the system includes an access point through which the device may communicate with the internet. In this example, the device may not require connectivity to the host.

The access point may take various forms. For example, if the device connects using 802.11 or via an Ethernet connection, the access point may take the form of a wireless access point (WAP) or wireless router 168. As another example, if the device connects using a cellular air-interface protocol, such as a CDMA or GSM protocol, the access point may be a base station in a cellular network, that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, GPRS, CDMA, EV-DO, and/or HSPDA, among others.

The device may be configured to connect to access point using multiple wired and/or wireless protocols, such as "4G" or "5G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internet through the host.

Glasses Connecting to the Devices Through the Internet

The glasses can communicate with the device through the internet. The glasses having a cell glasses transmitter and receiver, for connecting to a cell glasses tower. The glasses connect to glasses server 168 on the internet thru the tower.

The device connects to an internet router, either wirelessly, or wired. The device router connects to a device server, on the internet. The glasses, and device each have a, compatible communication software. The glasses server connects to the device server, over the internet.

The glasses have a global positioning system GPS, and the device has a GPS. The position of the glasses, and device are plotted on a map on the server, such as, an internet map. The map determines the distance from the glasses, to the device.

The glasses, and or device, both broadcast on their respective servers, their availability to connect with each other. The glasses broadcasts that's it's available to connect to the device, and the device broadcasts being available to connect to the glasses.

When the glasses, and device are at a distance, of 30 meters, on the map, the device, and glasses connect with each other through the server. The device, or user manually request the device send its virtual control panel to the glasses. The control panel is displayed. The user operates the device, by inputting into the control panel. The inputs into the control panel, are sent to the device.

The device uses the received inputs into its control panel, to effect, influence the operation of the device. The influenced operation of the device is sent, to the glasses. The glasses display the influenced operation of the device.

Many Devices Control Panels Displayed by Glasses

Many different external device's software, for device's control panels, can download the to the glasses' computer. The different devices, which are available to be operated, can be shown on the display. The user can input, which device they choose to operate.

Glasses can Connect to Many Device Simultaneously

The glasses can operate more than one device at a time. Two devices operating menus can be shown, on the display. The user can input into the operating menus consecutively, such as, the user can operate a vending machine, then operate the room lights.

Programming

Computer program code for carrying out operations of the object detection, and selection mechanism may be written in any combination of one or more programming languages, including an object-oriented programming language such as Java, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Software

The glasses and device use a compatible software language, a standardized software language, a communication software language to communicate with each other. The devices each have a computer, with a microprocessor connected to a storage. The computer in the glasses are used for processing, the operation of the downloaded device control panel.

The glasses, and external devices, have the computer communication software, that allows them to communicate and operate, with each other. The software allows for the transference, download of operating panel displays, from the external devices to the glasses.

The Glasses Computer can be Used to Store Software

The glasses can keep and store the software which was downloaded from the device, to use with the device the next time the device is operated. The device can have a unique identifier, which is associated to its operating software. The identifier can be used for the glasses to identify the device, and use the stored software for the operation of the device. The software can be stored in a profile of user settings, which are associated with the user, and or the elevator.

The Glasses Computer can be Used as Computer for a Device

The computer in the glasses, can be used as the computer, which is used to operate an elevator. Other devices that the glasses computer may operate include, smart toilets, and automatic teller machines Atms.

User inputs into the Atm, may include, login pin number, deposit input, withdraw input, checking account selection, and menu, inputted by the user, the computer in the glasses connects to the device, and is programmed with software for the device it operates.

The glasses computer can have preprogramed software to operate different devices, such as, elevators, vending machines, medical device, and self-serve gas pumps.

Finding and Operating Different Devices Operation

Figure 4:
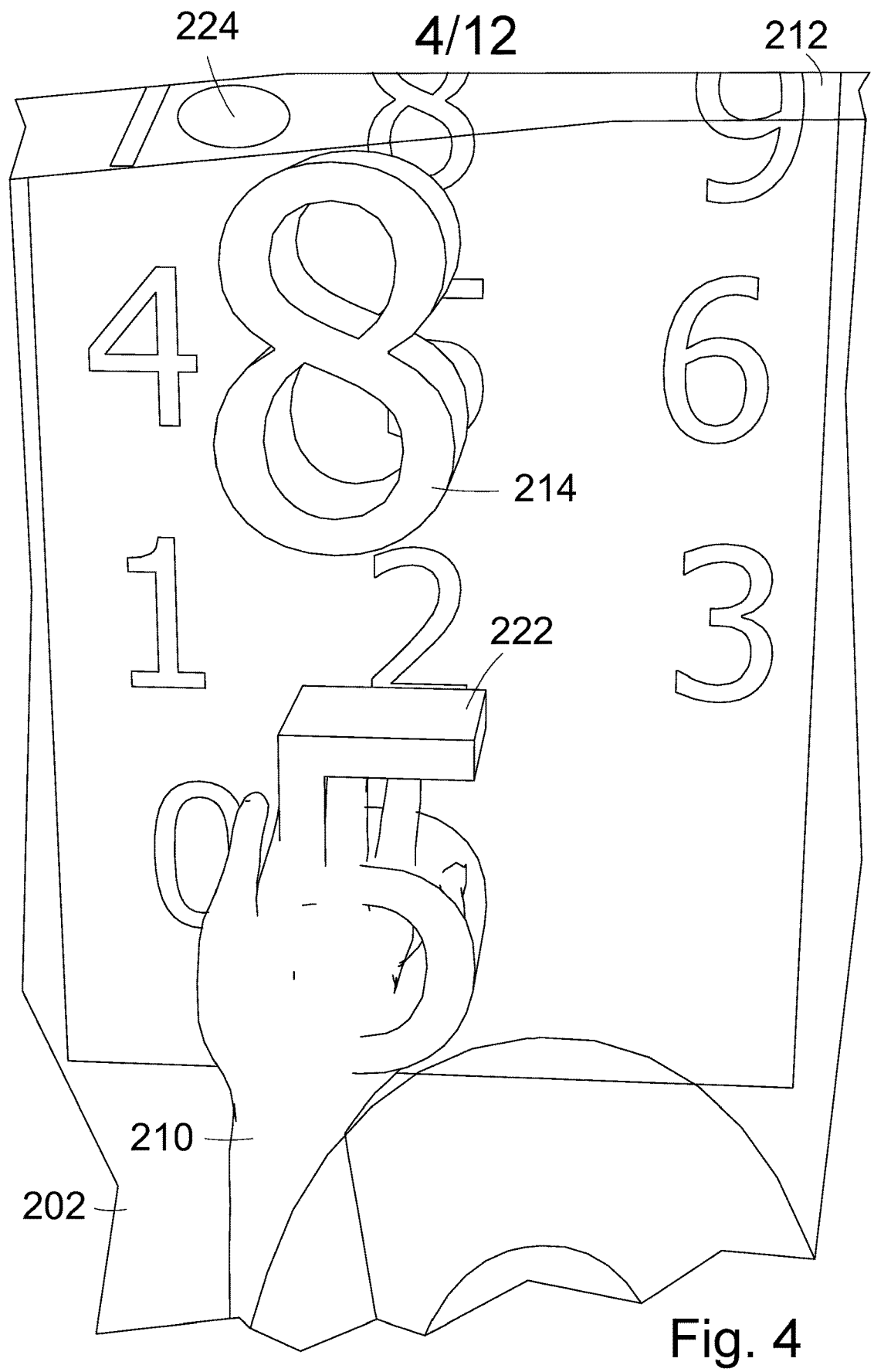
FIG. 4 shows a close-up perspective view, of mixed reality glasses, with input icons, for an elevator.

Examples of Glasses Used to Operate Multiple Devices, Including, an Elevator, an Internet Browser, a Smart Toilet, and a Store Checkout Machine Elevator A user approaches an elevator 462. The glasses connect to the elevator, as illustrated in FIG. 4.

The multiuser elevator's input icons are displayed on the glasses' screen. The user's touches at one of the elevator icons, the icon highlights, a timer is activated, and the icon activates.

The activated elevator icon activates the elevator's control panel to be displayed. The control panel shows an up button, or down button input icons. The user mid-air touches an up button of the menu, and the up-button illuminates, and the elevator is called to the user's floor.

The user gets on the elevator, and a menu for the inside of the elevator is displayed on the glasses' screen. The inside menu shows, floor number options, I, 2, 3, 4 floor numbers, and open door, etc.

The user touches the 3-floor button, and the button is activated, and the elevator moves to the 3 floors. The user stops the showing of the displayed menu on the glasses' screen, after using the elevator Public Smart Toilet Example The user operates a public smart toilet, having an electronic bidet. The bidet's operating menu is displayed in mid-air. The menu shows input icons, whose functions are associated, to operations of the toilet. An activated icon input operates, the associated toilet device. The menu shows input options such as, front wash, back wash, water temperature settings warm water, water pressure, water pressure increase, or water pressure decrease.

The user uses touch to activate, a back wash setting 304, a warm water temperature setting, and increases the water pressure, and a start icon. The bidet starts the directing of warm water, at the user's back position. The toilet's display shows, the operation of the toilet.

Store Checkout Machine Example

The user goes shopping at a store. The user gets potato chips, and oranges. The user checks out, at a self-serve check out payment station. The cost of the products is displayed, on the glasses' mid-air screen.

To pay for the products, the user touches their debit card, credit card, or electronic commerce company account, to open the payment system. The user inputs their personal identification number, or password, using a displayed keyboard, or number keypad, and touches the desired letter, or number.

The user opens their electronic commerce account, and transfers funds from their account to the machine. The machine accepts the funds. The machine shows, that the user has paid for the products.

Touch Used to Avoid Bacteria on a Public Light Switch

The glasses may reduce the spread of anti-biotic resistant bacteria, when used to operate devices, such as, public light switches, by using touch on the glasses' screen. The user doesn't need to touch the control surfaces of the devices, to operate them.

The surfaces may have bacteria, or viruses on them. The bacteria can be transferred to the user's fingers, infecting the user, and possibly causing illness. Touch operation of the switch on the glasses' screen, limits the bacteria, or viruses on hands, which limits the amount of bacterial transmitted from hands to surfaces, and from hands to other people.

The light switch is wirelessly, connected to the glasses. The light switch control panel, has input icons, and is displayed on the glasses' screen. The icons include, a light off, or lights on icons, and a light dimming option.

The touch screen detects the user's touch, of the off icon. The off icon is inputted, by the detection of the user's touch at the off icon. The light is turned off, by the input of the off icon.

Public Flammable Vapor Environment Device

When the user's glasses, is near a public flammable environment device. The glasses wirelessly detect the device and communicates, with the device. The device control display panel icon is downloaded, to the glasses' display. The downloading of the icon indicates, that the device is available for operation.

The glasses may connect to, and communicate to different external devices, using a radio wave connection between the glasses and the differing devices, and or an internet connection between the glasses and the differing devices.

The user sees a flammable environment device icon, with a description of the device, associated with the icon. The user activates the icon with touch. The activated icon displays a control panel menu. The menu includes icons show differing functions, associated with operations of the device.

The user operates the device by using touch to activate differing icons, associated with differing functions of the device.

The glasses control panel can reduce, the problem of static electricity, in a flammable vapor environment. The user may create a static electric discharge, between the user's finger and an external device's display panel. The electric discharge may ignite, air borne flammable vapor or material. Since the glasses are in the electrical field of the user, an is less likely to produce static electric discharge by touching the glasses' screen in air molecules.

Using touch to operate the device, reduces the need to touch the physical external device display, to operate the device. Using the glasses in flammable environments, may be aid in reducing the chance of ignition of air borne flammable vapours or particles.

Airborne flammable vapor or particles may be present in the air, in locations, such as, silos with grain dust, petroleum refineries, and paint plants. The flammable environment device could be a, oxygen tank regulator control panel for a person's oxygen mask, used by a gas compressor, an elevator, and multiuser a computer keyboard.

Devices Activated by Touch Input Icons Associated to the Device

The glasses can connect to, and operate electronic devices, such as, a multiuser medical device, a flammable environment device, public interactive devices, a door lock, a car lock, a car ignition, a room temperature thermostat, tennis court lights, hospital devices, such as, hospital elevators, or multiuser ex-ray machines, and a public microwave oven. The glasses can find a public multiuser ride share car, in a parking lot.

The glasses can be used to operate, virtual keyboards, library keyboards, shared workplace keyboards, gym athletic equipment interactive display screens, computer games, hotel TV remote controls, hospital bed control panels, public computer terminals that use a keyboard.

Public interactive device may include electronic devices, such as hotel doors locks, space station devices, flammable environment devices, elevators, and space station devices.

Automatically Display Device Control Panels

The control panel can be operated independently of the device's location, for example, an elevator call control panel, can be operated 5 meters for the elevator control panel, and out of view of the physical panel. The user can call the elevator, using the call panel. Some devices could rely solely on the panel for operation, without having a physical touch screen input control panel.

Many devices menus can be displayed which are near each other, such as, a vending machine menu, an elevator call button, and an automatic teller machine, etc., in the same room.

Public Vending Machine

A vending machine menu displays food, chips, drinks, candy for sale. The user touches, the displayed chips icon. The touched chips icon activates. The user pays for the chips, by opening their electronic commerce account, and transferring funds from their account to the vending machine. The machine accepts the funds and delivers, the chips.

The user can also pay, the vending machine, with funds having been downloaded to the glasses, and which are displayed on the glasses, and are touch inputted, and sent to the vending machine.

Multiuser Space Station Devices

In a space station's dry air environment. The user may create a static electric discharge, between the user's finger and a physical display panel, that is used to operate a multiuser device. Static electric discharge is reduced, by not touching the physical input panel. Touch allows a device, to be operated without needing to touch the physical display panel. The user is less likely to produce static electric discharge by touching the glasses' screen in mid-air.

A space station's devices could include, a variety of devices, such as, a space station robotic operating arm control panel, with some inputs to move the arm left or right or up or down. A displayed option to operate the arm left-handed, or right-handed, can be inputted with touch. A space station toilet, medium toilet water temperature setting, can be displayed and inputted.

The glasses' operation is a universal mobile input device, for operating different devices. For example, a space station glasses can operate, the space station moving arm, and then in a different input configuration, the glasses can operate a station camera mover. The glasses operate many devices, without the need of having two, or more different physical input devices.

The glasses can save space, by allowing to the control panel to be virtual, without need for a physical control panel. The glasses can have control panels, for different devices, saving the space needed for the physical different panels.

Gas Pump

The user uses the interactive input display, to operate a gas pump. The user can activate the pump's input icons, by touching the displayed icons. The user touches the gas pump input icons, to choose the octane of gas, or pay for the gas. The activated icons, are displayed, are associated with the operation of the pump, and activate gas pump functions, such as, delivery of gas, or payment of the gas. The glasses receive feedback information, while the device is operating, such as, how much gas is being pumped.

Public Door Lock

The glasses screen can show a public door unlock options, yes, or no. Using touch to activate a yes, wirelessly signals, the door to unlock. The lock could also use a pin number, to unlock the lock. Touch entering the pin number, would unlock the door. With the door unlocked, the user has the option of touch locking the door using a shown, lock door on the display.

A Public car menu shows, a start, or stop an engine option. A preferred car seat temperature increase or decrease option, can be displayed, and inputted.

Public Room Thermostat

Room temperature can be controlled by touch. The glasses display can show a thermostat, whose temperature can be raised or lowered. The user operates the room thermostat, by touch activating, the desired thermostat's temperature shown on the glasses, like 23 degrees c.

Multiuser Radio

The touch glasses display operates a radio, by using touch to operate the radio's displayed operating menu, such as, FM or Am channel selection, radio station tuning displayed number, and volume control increase or decrease.

Public Microwave Oven

The glasses operate a communal microwave oven, using the displayed operating microwave oven operating menu, such as, cooking time, and heat power setting percentage.

Automated Teller Machine

An Atm display input panel appears. The panel shows a menu, of the Atm's operations, that can be activate by touch. The glasses receive feedback information, while the device is operating, about the Atm, such as, the amount of funds deposited, account balances.

With more than one Atm, the Atm physically show numbers, that correspond to Atm numbers on the glasses display. The user chooses the numbered Atm, such as, 1, and activates the same displayed number 1, associated Atm icon.

The activated Atm icon input operates, one of the functions of the Atm. Atm functions include, user cash deposits, cash withdraws, and other banking transactions.

Laptop

The touch glasses display can operate, a laptop computer. The laptop's input display screen is cloned to the glasses' display. is shown on the glasses display. The laptop display shown on glasses display can operate the computer, in a similar fashion as the display on the computer would operate the computer.

The user touches the computer display icons on the glasses display, which operates, and inputs data to the laptop computer. The glasses display is connected to the computer, using and internet connection, the user can surf the internet, and operate other computer applications. The glasses computer is connected to the internet.

Multiuser Television

The touch glasses display operates a TV, by using touch of the TV's displayed operating menu, by using the TV's displayed operating menu showing inputs, such as, channel selection, and sound volume control, increase or decrease volume.

Machine in a Dust Free Environment

Touch input may be beneficial, in a dust free environment, such as, microprocessor fabrication environments. The glasses don't have moving parts. Physical key boards have moving parts, whose movement may create friction, which can create dust.

The friction causes particles from both surfaces to detach, from the surfaces, and become airborne. The particles then descend to a surface, which creates dust on the surface. Dust on the surface of a microprocessor, may have a negative impact on the microprocessor's production.

Glasses keyboard is displayed in the dust free environment. A on off switch is displayed. The glasses are connected, to a microprocessor fabrication machine, or a light switch.

The touch screen is used in the dust free environment to input into a control panel, to operate a device in the environment.

The user touches the different icon button inputs. Each button is associated to a selection, of one of a variety of operations of one of the devices, in the dust free environment, such as, the computer, or microprocessor fabrication machine. The user chooses an icon, such as, the enter, or space icon to select the desired device operation. The user can turn the device on or off, by touch inputting, the either on or off icon.

Finding and Operating a Vending Machine with Glasses Map Description

Glasses have a displayed map. The map has a search window. A blinking cursor appears when the search window is touch, and a virtual keyboard appears. The user is within reach of touching individual keys of the qwerty keyboard. Touched keys enter letters, numbers, punctuation, or symbols, in the window.

Names are typed in the window, and are searched by touching a displayed enter button. Typed search results for devices, like, vending machine, show displayed icons associated to the devices, at locations on the map, that are associated to the locations of the vending machines.

The vending machine icons visually describe pictorially, or in writing the vending machine, such as, a drawing of a vending machine, or the word vending machine is spelled.

Vending Machine Product Choices

Displays commands include, pay with wallet, potato chips, corn chips, chocolate bar, water, cherry gum, cookies, hot dog, pizza, popcorn, sprite soda, coke, pretzels, cake, cheetos, cheese puffs, mints, and ice cream.

Finding and Operating a Vending Machine with Glasses Map Operation

Finding the Vending Machine

The user types in vending machine, in the search window, using the virtual key board. Vending machines that are available for operation, by the glasses are displayed. The displayed vending machines show a description, of the vending machine's products, such as, like, chips, soda, ice cream, candy, mints, gum, coffee, pizza, and hamburgers.

Route Inside the Building

Inside the building, the user follows the route, on the map of the building to the vending machine. The map includes, the route on a 1st floor, and stairs to take to the floor that the vending machine is on, such as, 2nd floor. Once on the 2nd floor, the map shows a 2nd floor map with route to the vending machine.

Example of Vending Machine Operation

The user picks one of the displayed vending machines, from many vending machines. The user touches the vending machine icon that's say chips, to open the machines control panel.

The panel displays, potato chips, chocolate bar, water, cherry gum, cookies, hot dogs, pizza, popcorn, sprite soda, coke, pretzels, cake, cheese chips, mints, ice cream. The user touches the potato chip icon, the chip icon is highlighted, and the price for the chips is displayed. The user touches the wallet pay icon, and pays with a digital wallet on the glasses. The chips are delivered by vending machine, the for the user to retrieve.

Finding and Operating a Smart Toilet with Glasses Map Description

Figure 9:
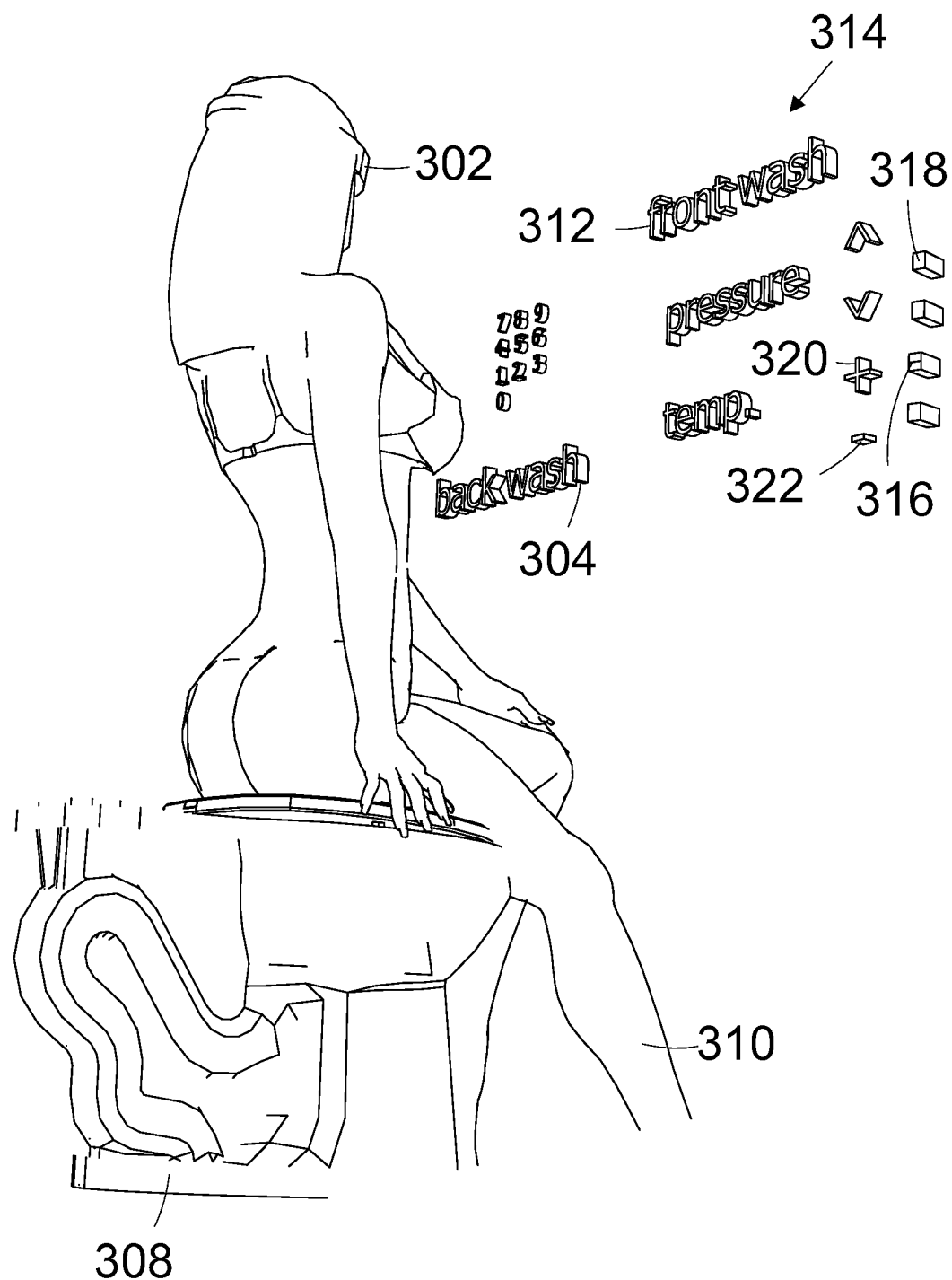
FIG. 9 shows a perspective view, of mixed reality glasses, with input icons, for a multi-user smart toilet.

Glasses' Location and Smart Toilet is Displayed on an Internet Map on the Glasses Smart toilet is typed into the search window, in FIG. 9. Smart toilets locations are plotted and displayed on the map. The displayed smart toilets, are shown as icons graphically representative of the smart toilet. Different fastest routes from the glasses' location to the smart toilet 308, are displayed on the map, when the user touches the smart toilet that they want to go to. The user can follow one of the routes to reach the smart toilet.

Routes are shown to a building with the toilet 308, and route inside of the building housing the toilet. With the routed mapped, plotted to a map of the inside of the building. The user follows one of the routes to the smart toilet. The glasses display a mid-air control panel 314, having input icons, who's each touch activation, is associated to activating an operation of the smart toilet.

An activated displayed icon command, activates the smart toilet's operation associated to the icon command, for example, touch of a smart toilet icon command activates the command being touched, for example, activation of a displayed increase water temperature icon 320, activates the increase water temperature operation of an electronic bidet in the smart toilet, the increased water temperature operation increases the water temperature of the water flowing from the bidet.

An activation of a decrease water temperature icon 322 activates, the decrease water temperature operation of the bidet in the smart toilet, the decreased water temperature operation decreases the water temperature of the water flowing from the bidet. The commands can be displayed as being on a scale of 1-4, with 4 being the highest temperature 318, and 1 being the lowest temperature 316.

An activation of a back-wash icon 304 activates, the back-wash operation of the bidet in the smart toilet, the back-wash operation directs water flowing from the bidet, at the users back elimination position. An activation of a front-wash icon 312 activates, the front-wash operation of the bidet in the smart toilet, the front-wash operation directs water flowing from the bidet at the user's front elimination position, female bladder opening.

An activation of a decrease water pressure icon activates, the decrease water pressure operation of the bidet in the smart toilet, the decreased water pressure operation decreases the water pressure of the water flowing from the bidet. An activation of an increase water pressure icon activates, the increase water pressure operation of the bidet in the smart toilet, the increased water pressure operation increases the water pressure of the water flowing from the bidet.

Other commands associated to an operation of the bidet, and the operations description, include oscillating water spray pattern, and pulsating water spray, increase or decrease the time of the front or back wash with a displayed clock, warm wash, hot wash, cool, wash, start, stop, bottom dryer temperature increase, bottom dryer increase air flow.

The Smart Toilet Sends Information to the Glasses

The smart toilet sends information to the glasses, about the operations of the toilet, which is displayed on the display, such as, water temperature, water pressure, time until the water being sprayed ends, the time left for the front wash, The displayed data keeps the user informed, about the toilets operation, and interaction with the user. The user can use the displayed toilet data, to adjust the operation of the toilet, such as, touch increasing the time of the front wash, decreasing the waters pressure, decreasing the waters temperature, and changing the oscillating water spray, water spray pattern, and pulsating water spray.

Mid Air Touch Screen Input

The user can input, using touch screen, one of the input icons, letters, words, and written phrases, of the display menu.

The user touches, with their fingers, the icon command they want to activate, such as, a front wash input icon, the front wash input icon command is highlighted, the icon is left clicked, and the icon command is activated, and the front wash operation of the bidet is activated, and bidet washes the user's front of their posterior. The user can active another command, after the first command is activated.

Users Waiting to Use Public Smart Toilet

If the smart toilet is being used by another user, the smart toilet puts the user in line for using the smart toilet, and assigns the user a number, like, a number 2 in line. The number 2-line assignment is shown of the user's glasses. The smart toilet allows for one operator of the smart toilet at a time.

With multiple smart toilets, each smart toilet is assigned, a number, or letter, or designation for each smart toilet, like, 1, 2, 3, or a, b, c, d. The user touch chooses the smart toilet that they want to use, from the display smart toilets.

The glasses using the locations devices, like, gps, radio waves, to determine which toilet the user is occupying. The toilet and glasses can also automatically display the toilet's control panel, for the toilet in the toilet stall that the user has entered. The automatic panel displays the panel with the letter associated to the toilet the user is occupying.

The chosen smart toilet sends the user's glasses the control panel for the chosen smart toilet. The panel shows the toilet associated to the panel, namely, the letter d toilet. Each smart toilet has a control panel that is specific, to the smart toilet, and operates that specific smart toilet.

Automatically Determining which Toilet the User Wants to Use

Each smart toilet has a number, and occupies a toilet stall of the same number. The glasses camera views which toilet and the number of the toilet that the user is Infront off. The glasses send the toilet's the number, and the control panel the user is using is labelled with the number. The glasses could also communicate the number, and the toilet sends the labelled control panel to the glasses or the number toilet, which the glasses downloads, or find ins in the glasses storage the toilet's control panel, and labels the panel with the number of the Atm. If the user moves to a different toilet, and stall the new number would be used on the toilet control panel.

The glasses' computer directs the smart toilet's computer, to carry out the input request of the user. For example, the user touches the back-wash icon. The back-wash input is detected by the sensor and the computer. The glasses' computer directs the smart toilet computer, to start a bidet backwash.

Finding and Operating a Smart Toilet with Glasses Map Operation

Finding the Smart Toilet

The user 310 connects to the internet thru the mobile glasses 5G network, or thru a WIFI connection, in FIG. 9. The user types in smart toilets in the search window, with on the virtual key board. Available smart toilets that are available for operation, by the glasses are displayed. The displayed smart toilets show a description, of the smart toilets, such as, the time of operation.

The user touch chooses, in mid-air, one of the smart toilets, and chooses to have directions and routes shown to the smart toilet. The user follows one of the routes to the building with the smart toilet.

Inside the building the user follows the routed on the map of the building to the smart toilet. The map includes a 1st floor, and elevator to take to the floor that the toilet is on, such as, 3rd floor. Once on the 3rd floor the map shows a 3rd floor, map with route to the toilet.

The routes include the time to the smart toilet, by car, waking, and public transportation, bus, or subway. The directions and routes are displayed.

When the user is close to the smart toilets, like, 20 meters. The smart toilet icon is activated by touch by the user. The smart toilets control panel is displayed, on the mid-air display. The user chooses the letter d toilet. The d toilet d control panel is displayed with the letter d displayed, on the panel.

Example of Toilet Operation

The user touches the front wash icon, in mid-air, the warm wash icon, the low-pressure icon, start icon. The bidet directs water to the user's front position for, like, 2 minutes. The user touches the increases temperature icon. The water temperature is increased. The water stops when the displayed time is ended, or a stop buttons is touched. The air dryer starts when a dryer button is touched. The user presses the stop button, to stop the air dryer, the air dryer stops. The user vacates the toilet.

The user uses touch to activate, a back-wash setting, a warm water temperature setting, and increases the water pressure, and a start icon. The bidet starts the directing of warm water, at the user's back position. The toilet's display, shows the operation of the toilet, doing the warm water, and back wash operation.

Finding and Operating a Light with Glasses Map Description

Glasses have a Displayed Map

Glasses have a displayed map, in mid-air. The map has a search window. The map shows the floor that the user is on, a floor map of the of the floor. The building has a building computer. The glasses connect to the building computer.

Typed search results for devices, like, lights, show displayed icons associated to the lights, at locations on the map, that are associated to the locations of the lights. The lights icons visually describe pictorially, or in writing the lights, such as, a drawing of a lights, or the word light is lights.

A route function is displayed. in mid-air, that when touch activated, plots a route from the glasses to one of the lights. Th route follows hallways, stairs, and routes inside a building housing the lights, that are accessible by walking. The user can activate lights, when they are in the same room as the light, or in a different room than the light.

When one of the light icons is touched, the icon opens, the control panel, of the icon. The control panel displays on, off, or dim icons. Additionally, setting icons can include time for computer, to turn on, or turn off, of dim the light, or lights.

The touch activated command, sent from the glasses instructions to the building computer, like, touch activating the on light signals, sends instructions to the building computer, to turn on the light. The received cony signal by the building computer, activates the building computer to turn on the light, the light is turned on.

Finding and Operating an Light with Glasses Map Operation

Route Inside the Building

Inside the building, the user follows the route, on the map of the building, to the light. The map includes, the route on a 1st floor, and stairs to take to the floor that the light is on, such as, 2nd floor. Once on the 2nd floor, the map shows a 2nd floor map with route to one of the lights.

Example of Light Operation

When the user is close to the light, like, 10 meters. The light icon is activated, by touch by the user. The activated light icon activates, the displaying of the light's control panel.

The control panel for the light is displayed. The user touches the dim icon on the panel, and the light dims. Each time the light dim icon is touched, the light dims, the light gets dimmer. A sliding light dim icon, that dims the light when moved in a direction on the display, can also be used to dim the light.

Fast Food Restaurant Self Order, Finding and Operating with Glasses Map Description Restaurants are Typed into the Search Window The map has a displayed in mid-air, search function window. A displayed keyboard is used to type into, the search function window. Searches for devices, and devices that can be operated by the glasses, such as, restaurant menus, can be typed. When the user looks at the map, the devices that the glasses can operate are displayed, like, the restaurant menus.

When restaurants are typed into the search window, restaurant menus locations are plotted, and displayed on the map. The displayed restaurant menus are shown as icons representative of a restaurant menus.

A route function is displayed, that when touch activated, plots a route from the glasses to the restaurant. Th route follows roads, and routes inside a building housing the restaurant, that are accessible by car, and or walking.

Connecting Glasses and Restaurant

Touch of a chosen restaurant menu, signals the server to connect the glasses to the restaurant's computer, through the server. The glasses ask the restaurant, for the restaurant panel. The restaurant can also automatically, send the panel to the glasses when they connect.

The glasses broadcasts and receives radio waves. The glasses connect to the internet, or to the restaurant computer using radio waves.

Glasses Displaying Restaurant Control Panel

The received panel is displayed. The panel shows icons that are available for the user to activate with touch, that will affect the operation of the restaurant. The touch activation of one of the displayed restaurant operation icon, signals the restaurant's computer, to activate the restaurant operation that is associated to the activated operation icon.

The Restaurant's Menu

The restaurant's menu, includes, hamburgers, cheese burgers, peperoni pizza, ham pizza, slice of cheese pizza fried chicken leg, french fries, fried chicken breast, bean burrito, beef burrito, salmon sushi, scrambled eggs, hot dog, fried eggs, chili, chicken sandwich, fish sandwich, beef wrap, pork fried rice, shrimp and noodle, salad, egg breakfast, grilled cheese, pad thai, chicken chow mein, sandwich, salad with chicken, baked potato, meatball submarine sandwich, chicken soup, chocolate donut, coffee, ginger ale, cola beverage, orange soda, 7up, milk, and water.

Self-Serve Restaurant Payment

The display shows order payment menu input icons, that include, a cash payment, credit or debit card payment. A total products price amount area is displayed.

The user views the different input commands, on the display, such as, a ten-key number pad 1, 2, 3, 4, 5-0, amount of purchase, accept purchase amount, enter, and credit card number.

The user inputs numbers into the display pad, by individually touching one of the numbers, such as, a number 0. The numbers can be entered, to input a debit card, or credit card pin number into the computer. The input can be shown on the display.

A credit card can be stored on the glasses. The glasses can also store the user's financial account, such as, bank account, electronic commerce (e-commerce) company account, debit card, credit card account over the internet, and paying from the account. The computer inputs a PIN number, inputted by the user.

The payment information is displayed on the display can be used as, a self-serve checkout display, where the user checks out their own purchases. The payment display can also be, a served checkout payment display, where an employee of the restaurant, checks out the user's food or drink purchases, and accepts payment for the purchases.

The data inputted by the user into the display, is displayed on the display. The displayed data keeps the user informed about the payment operation, and interaction with the user. The user can use the displayed data, to adjust the operation of the payment menu, such as, changing a personal identification number PIN number if a first number is incorrect.

A physical credit card reader can be used to pay of the order, by the glasses view of a number displayed on the reader that the user is standing in front of. The user touches a displayed pay with card reader, and the restaurant computer, sends the purchase amount to the reader with the number. The user pays with a physical credit, or debit card.

Restaurant Employees Viewing the User's Order

The menu items inputted by the user into the glasses display, are sent to the restaurant display. The restaurant employees view the user's order. The employees prepare the ordered food. The restaurant sends the glasses a notification that the order is ready. The prepared food can be picked up by the user or delivered to the user's table.

Transference of bacteria from the payment station touch control panel is reduced, by using the glasses menu control panel to order food.

Ordering with a Restaurant Food Order Kiosk with the Glasses

The user can connect directly with the restaurant computer, and download and display the restaurant menu, and menu control panel. The user can also order food by operating a restaurant kiosk with the glasses. The kiosk displays the menu, control panel on the kiosk, and menu, control panel is also displayed on the glasses display.

Touch Operating the Menu Display in Mid-Air

Each menu item has a picture icon, that is a picture of the item, such as, a beef burrito icon is a picture of the beef burrito, or a graphical representation the beef burrito. The menu food, and drink icons are inputted by touch, into an order associated to the user. Items in the order can be removed by touch inputting the item in the order, which displays a check mark next to the item. The user touches a remove item icon, and the check marked item is removed from the order.

Restaurant Employees Viewing the User's Order

The menu items inputted by the user into the glasses display, are sent to the restaurant display. The restaurant employees view the user's order. The employees prepare the ordered food. The prepared food can be picked up by the user or delivered, to the user's table. A number is assigned to the user's order.

Connections Between Glasses and the Store Restaurant Computer

The glasses computer connects to the restaurant computer, which is connected to the kiosk. The restaurant computer connects to a restaurant employee display. The restaurant computer operates the menu, and payment menu.

Fast Food Restaurant Self Order, Finding and Operating with Glasses Map Operation Finding the Restaurant The user connects to the internet thru the mobile glasses network, or thru a WIFI connection. The user types in restaurants, in the search window, using the virtual key board. Restaurants that are available for operation, by the glasses are displayed. The displayed restaurants show a description, of the restaurants, such as, the floors being used by the restaurant, like, 2nd floor.

The user touch chooses one of the restaurants and chooses to have directions and routes to the restaurant shown. The routes include the time to the restaurant, by car, waking, and public transportation, bus, or subway. The user follows one of the shown routes, to the building with the restaurant Example of Restaurant Operation The user uses touches the restaurant icon to activate, the start order icon. A menu is displayed. The items that the user orders are part of the order. The order is assigned to the user, with a number, or a picture of the user taken by a camera in the glasses. The order is viewed by the employees.

The user uses their finger to activate the displayed icons, that they want activated. The user touches their finger on one of the mid-air displayed icon items, that they want to activate, such as the cheese burger input icon.

The cheese burger icon is highlighted, clicked, and activated. The activated cheese burger item is put, on the user's order.

The user can active another icon command, after the first command is activated, like, fries, 7up soda, coffee, etc. Other commands include, cancel, change order which allows the user to delete, remove items put on the order. The change icon can also be used, to activate icons that are increase order size icons, like, make the drink a larger size, or fries to a larger size, extra cheese, or extra ketchup. Numbers 0-9 icons on a ten-icon pad, can be imputed for number of items, like, three 3 chicken sandwiches, or 2 strawberry milk shakes.

The user touches, contacts the ham pizza icon, on the display. The ham pizza icon is highlighted. The touched ham pizza icon is left clicked and activated. The activated ham pizza icon is associated, to activating a function of the computer, to have ham pizza, include in the user's order.

The user completes their order and touches, a finish and pay enter icon. The user pays with the credit card that is on the glasses. The restaurant receives the paid order. The user waits for their order to be prepared. The restaurant shows the time remaining till the order is ready, and each item that is already prepared. The restaurant sends the glasses a notification that the order is ready. The user can pick up the order in the restaurant, or it can be delivered to a booth, or table the user is sitting at.

Finding and Operating an Atm with Glasses Map Description

Glasses have a Map Displayed in Mid-Air

Glasses have a displayed map. The map has a displayed, search function window. A displayed keyboard is used to type into, the search function window. Searches for devices, and devices that can be operated by the glasses, such as, Atm s, elevators, smart toilets, can be typed. When the user looks at the map, the devices that the glasses can operate are displayed, like, the Atm.

When Atm is typed into the search window, Automated teller machine Atm s locations are plotted, and displayed on the map. The displayed Atms are shown as icons representative of an ATM.

When the user touches the Atm that they want to go to, different fastest routes from the glasses' location to the Atm, are displayed on the map. The user can follow one of the routes to reach the Atm. The glasses' display screen is a touch screen.

Glasses Connections to the ATM

The glasses are connected to the internet, thru a 4 g, or 5G (5th generation) mobile micro wave network. The glasses are also connectable to WIFI, WIFI direct, internet connections.

The glasses are connectable to WIFI, WIFI direct, and or Bluetooth enabled automatic teller machines ATMs. The Atm is connected to the internet using by a wired or wireless connection. The Atm is connected to the Atm's financial institution thru the internet.

The glasses' computer is connected, to glasses Bluetooth, or Wi-Fi, light waves, mobile micro wave network radio device transmitter, and receiver. The automatic teller machine Atm is connected to an Atm Bluetooth or Wi-Fi, light waves, 5G mobile micro wave network, radio device transmitter, and receiver.

Automatic Connection of Glasses to Atm

If the glasses have connected to the Atm before, or a first-time use, the glasses can connect automatically to the Atm, when the glasses are within 20 meters of the Atm. An Atm icon on the is highlighted showing the glasses are connected to the Atm.

The Atm broadcasts wirelessly, or on the internet, that its available to be operated. The glasses search for devices, like the Atm, that broadcasts wirelessly, and or on the internet, that the Atm available to be operated by glasses.

A server or servers, that the glasses are connected thru, determines, using the glasses gps (global positioning system) coordinates, and the Atm's gps coordinates, when the glasses are 20 meters from the Atm. The server plots the glasses' location and the Atm's location on the map.

At 20 meters, the servers connect, the glasses and the Atm. The glasses and Atm can also connect automatically, when the glasses detect receiving, the radio waves of the broadcast from the Atm, or when the glasses are within range, and able to connect to the amt. When the Atm is connected, the Atm's icon is highlighted on the map, showing that it is connected.

Activating the ATM's Control Panel on the Glasses

The Atm icon is activatable by the touch of a user's finger. The activated Atm icon connects the glasses to the Atm. When the Atm is connected to the glasses, the Atm sends the glasses, the Atm's control panel. The glasses receive the sent control panel and downloads, the Atm control panel to the glasses.

The control panel displays commands of the Atm, that are activated by the contact, touch of the user's finger. The activation of one of the commands activates an operation of the Atm that is associated to the command, such as, an activated enter command, activates an enter operation of the Atm's computer.

The Atm Displays the Control Panel

The Atm displays the control panel, and the operations on the Atm, that is displayed on the glasses. The same information displayed on the glasses and the Atm, reassures the user that they are using the same Atm's control panel, menu as the menu show on the glasses.

Control Panel Menu Instructions

The control panel displays inputs, commands, Instructions that can be touch activated, including, deposit, withdrawal, checking, savings, credit, a 1-10 number pad, numbers 1, 2, 3, 4, 5, 6, 7, 8, 9, 0, log in, log out, withdrawal 20, 40, 100, enter, change, and cancel, etc. The activated commands can display, and or active different pages on the display, that are associated to the commands, like, activating will display the deposit page.

Control Panel Saved to Storage

The downloaded control panel is saved to the glasses' storage. The glasses display the down loaded Atm control panel. The stored Atm control panel, is used the next time the Atm icon connects the glasses.

When the Atm is connected to the glasses, the Atm or glasses checks the version of control panel stored on the glasses, and if the Atm has a new version of the Atm control panel, the Atm automatically sends the new version to the glasses to replace the past version. The new version is received by the glasses, and can either automatically replace the past version, or the user can be notified that a new control panel is available to be used, which the user can either activate or not activate.

The computer can act as the primary computer for the Atm, and operate the Atm, or can connect to an Atm computer that operates the Atm.

The glasses computer is programmed with an Atm operating software, glasses software, and a computer operating software. The glasses computer is connected to the internet, for communicating to with Atm devices, servers, or other computers over the internet. The Atm has software operating instructions for the various functions and devices of the Atm.

ATM Identifying the User

The user starts a session on the Atm, by identifying themselves to the Atm. The identified user's account is opened and displayed, on the glasses.

A login screen is displayed on the glasses. The login screen has a window for the user to type their account number, and another window to type in their password or pin number.

The user can also login, with a combination of ways to identify themselves to the Atm, and or pin, or by identifying themselves.

The user identifies themselves to the Atm, by using, either a debit card, or credit card, inserted into a machine card reader. The Atm can identify using facial recognition, of the user's face, viewed by a camera in the glasses, or an Atm camera connected to the Atm computer, positioned to view the user's face. A facial recognition software is in the glasses computer, or in the ATM computer.

A microphone is part of the glasses, and connected to the glasses computer, or an Atm microphone is part of the Atm, and connected to the Atm computer. The glasses have voice recognition software, or the Atm has Atm voice recognition software, the voice recognition is used to verify the user's identity, by comparing the present voice with a verified stored voice of the user.

The Atm can identify using hand recognition, of the user's hand, viewed by a camera in the glasses, or an Atm camera connected to the Atm computer, positioned to view the user's hand. A hand recognition software is in the glasses computer.

A non-touch finger print reader, palm reader, hand vein reader, is connected to the Atm, or is part of the glasses, with either device having finger print recognition software. A radio frequency identification card is part of the glasses, and a radio frequency identification card reader is part of the Atm. A software digital wallet is part of the glasses and includes the user ATM account information.

Users Waiting to Use the Atm

If the Atm is being used by another user, the Atm puts the user in line for using the Atm, and assigns the user a number, like, a number 2 in line. The number 2-line assignment is shown of the user's glasses. The Atm allows for one operator of the Atm at a time.

Automatically Determining which Atm the User Wants to Use

Each Atm has a number. The glasses camera views which Atm, and the number of the Atm that the user is Infront off. The glasses send the Atms the number, and the control panel the user is using is labelled with the number. The glasses could also communicate the number, and the Atm sends the labelled control panel to the glasses or the number Atm, which the glasses downloads, or findings in the glasses storage the Atm's control panel, and labels the panel with the number of the Atm. If the user moves to a different Atm the new number would be used on the Atm control panel.

Manually Determining which Atm the User Wants to Use, Touching the Atm on the Display to be Operated With multiple Atm, each Atm is assigned, a number, or letter, or designation for each Atm, like, 1, 2, 3, or a, b, c, d. The number is displayed on the physical Atm. The user views the physical Atm's number, that they are in line to use.

The map displays the many Atms, with each displayed Atm displaying the physical Atms number, that the displayed Atm corresponds with. The displayed Atms are positioned on the map, the same as the physical Atms are positioned physically, this allows the use to visually identify the Atms positions on the display, with the visual identification of the positions of the physical Atms.

Manually Determining which Atm the User Wants to Use

The user touch chooses the Atm that on the display that is the same as the number that they are in line to use, or vice versa. The user chooses the Atm they want to use on the display and then get in line with the am that is the same as the number item that they have chosen on the display. For example, the user is in line for the number 3 Atm, touches the 3 Atm on the display, to display the 3-number control panel, or vice versa.

The line, the Atm the user is going to use, is assigned a number on the panel, and the same number on the Atm, that the user can view. The user can also manually change the amt that they want to use, by touching a different Atm.

Automatically Determining which Atm the User Wants to Use

The glasses using the devices locations, gps, cell tower triangulation, to determine which Atm the user is in front of. When its determined which Atm the user is in front of, the Atm can send the glasses the panel, and the glasses can automatically display the Atm panel for the Atm that the user is standing inf front of. The automatic panel displays the panel with the letter, associated to the Atm the user is occupying.

The Atm can also use the facial recognition to identify the user, viewing the user thru the camera on the glasses. The identified user is viewed, by an Atm camera positioned to view users in front of the Atms, to determine which Atm the user is standing in front of. By using the facial recognition to identify the user in front of the Atms, and then where the user is located.

The glasses control panel is displayed for the Atm, that the user is in line for. If the user changes lines, the control panel will change to the line the user is in.

The Glasses Map System Operating the Different Devices

The glasses map system described in the embodiments uses the same system. The devices that the system operates are different, like, the system operates different devices, that include, smart toilet, Atms, elevators, gas pumps, public light switches, restaurant menus, and self-driving cars. The operation of the system for one device, is implied to be the same system for another device, even if the complete system isn't described. The complete description may not be described for all devices operated by the system, to conserve writing space. The glasses find, and operate different devices, the main difference in embodiments is the different operations of the different devices.

Limiting Possible Remote Operation

The device detects the distance from the glasses, and device, this is used to allow users within a certain distance, like, 10 meters, to operate the device, and users outside the distance wouldn't be able to operate the device. A user outside, say, 5 meters from an Atm, wouldn't be able to operate, the Atm. This is to try to limit, possible remote operation of the Atm.

Increased Security when Mid Air Touch Inputting Credit Card Pin Number

With an automatic teller machine Atm, the glasses offer added security. The user can input, their personal identification number, pin number, out of sight, of a possible hidden camera, that is positioned to view the number pad of the Atm. The pin may be used, by other people, if the user's Atm card information, is unknowingly skimmed, by a scam credit card skimming machine, when they use the Atm.

Same Glasses Map System Used for the Different Devices Embodiments

The Atm uses the same process, hardware and incorporates all the parts used in, described in the self-driving car embodiment description and operation, and the other embodiments. For reducing the use of space, the description and operation has been shortened for the Atm embodiment.

Finding and Operating an Atm with Glasses Operation

The user connects to the internet thru the mobile glasses network, or thru a WIFI connection. The user types in Atms in the search window with on the virtual key board. Available Atm machines that are available for operation, by the glasses are displayed. The displayed Atms show a description, of the Atm, such as, the bank name associated to the Atm.

The user touch chooses one of the Atms, touch chooses to have directions, and routes shown to the Atm. The routes include the time to the Atm, by car, waking, and public transportation, bus, or subway. The directions and routes are displayed. The user follows one of the routes to the Atm.

When the user is close to the automated teller machine Atm, like, 20 meters. The Atm icon is activated, by touch of the user. The Atm control panel is displayed on the display.

Control Panel Menu Instructions

The user touch activates one or more of the control panel displayed inputs, that include, deposit, withdrawal, checking, savings, credit, a 1-10 number pad, numbers 1, 2, 3, 4, 5, 6, 7, 8, 9, 0, log in, log out, withdrawal 20, 40, 100, enter, change, and cancel.

Operating a Withdrawal

The ten keypad is displayed, of inputting the different amount. The user touches, each number, the 2 number, and the 0 number, that makes up the amount the user would like to withdraw, such as, a 20.00 amount. The user touches. the enter icon. The withdrawal amount is entered, by touch activating the enter icon. The ATM dispenses the 20.00 amount.

Users Waiting to Use the Atm

The user chooses one of the displayed Atms. The chosen Atm sends the user's glasses the control panel for the chosen Atm. Each Atm has a control panel that is specific to the amt, and operates that specific Atm.

The User Starts a Session on the Atm by Identifying Themselves to the Atm

The user identifies themselves, logs in the user's Atm account, by using, either a debit card, or credit card, inserted into the machine card reader, or stored on the glasses, and a password or pin typed into the glasses displayed pin number window. The user can be identified using facial recognition of the user's face, viewed by the camera in the glasses, or the Atm camera, and the facial recognition software in the glasses computer, or in the ATM computer.

Other ways to identify the user include, the user logins to their account by speaking words that are detected by the glasses, or Atm microphone, and the voice is identified using the voice recognition software. The user can show in mid-air their finger, a finger print reader on the glasses, or the Atm. The radio frequency card can be within 5 meters of the Atm. The glasses' digital wallet connects to the Atm, and sends the user's account information to the Atm, the user than types in the pin number on the glasses.

Examples of Operating the ATM

The user inputs the deposit input, using touch. The deposit screen is displayed. The user touch inputs 10 dollars, by touching with their finger, at the numbers 1 and 0 on the number pad consecutively. The finger touch activates the enter input. The 10 dollars of currency is deposited, and accepted by the Atm, and the accepted deposit is displayed by the glasses. The user ends the session with the ATM, by using touch, to activate the log out input.

Finding and Operating an Elevator with Glasses Map Description

Glasses have a Displayed Map

Figure 3:
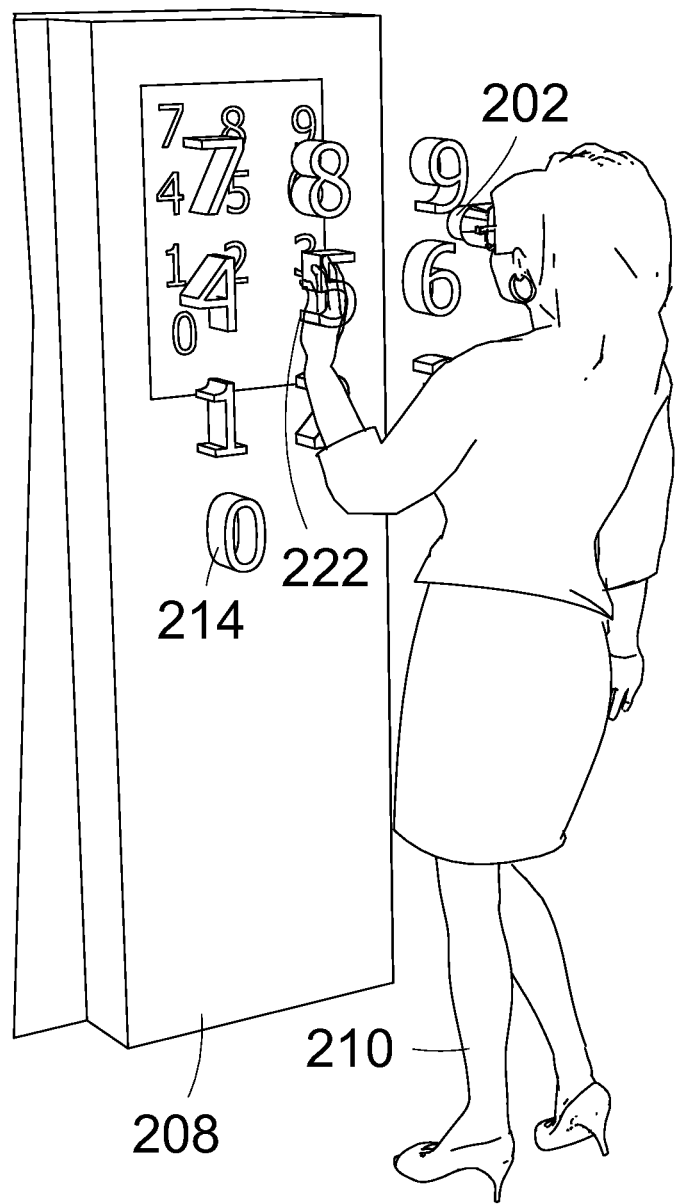
FIG. 3 shows a perspective view, of mixed reality glasses, with input icons, for an elevator.

Glasses have a displayed map, shown in FIGS. 3, and 4. The map has a search window. The glasses 202 connect to a sever on the internet. The server has locations of elevators, and other devices like, gas pumps, store check machines, plotted on the map. The glasses map has a virtual keyboard.

Typed search results for devices, like, elevator, show displayed icons associated to the devices, at locations on the map, that are associated to the locations of the elevators. The elevator icons visually describe pictorially, or in writing the elevator, such as, a drawing of an elevator, or the word elevator is spelled.

A route function is displayed, that when touch activated, plots a route from the glasses to the elevator. Th route follows roads, and routes inside a building housing the elevator, that are accessible by car, and or walking.

Example of Elevator Operation

An elevator call box is shown, as, an up or down arrow. A touch of the up arrow, calls the elevator 208 to the floor the user is on, like the 3rd floor, the elevator moves to the 3 floor, and the elevator door opens.

When the user walks into the elevator, the finger touches the displayed number 5 icon 222, and the 5 is activated. The activated 5 is sent to the elevator computer, from the glasses computer. The elevator moves to the 5th floor.

The user can also touch with their fingers, detected by finger trackers 224 in the glasses 202, on a mid-air touch display, one of the displayed items, that they want to activate, such as, close door, and number 6 floor.

Connecting Glasses to Elevator

Touch of a chosen elevator, signals the server to connect the glasses to the elevator's computer, through the server. The glasses ask the elevator, for the elevator panel. The elevator can also automatically, send the panel to the glasses when they connect.

The glasses broadcasts and receives radio waves. The glasses connect to the internet, or to the elevator using radio waves.

The elevator broadcasts and receives radio waves, and can connect to the internet, or to the glasses using radio waves. The glasses have glasses computer, and the elevator has an elevator computer.

The glasses and elevator can also communicate, when they are within radio wave range of each other. The glasses and elevator communicate with each other, when they are connected.

Glasses Displaying Elevator Control Panel

The elevator detects when the glasses and elevator connect and communicate with radio waves. The detection of communication signals, the elevator to send the glasses the elevator control panel 214, or the elevator to automatically send the panel to the glasses.

The received panel is displayed. The panel shows icons that are available for the user 210 to activate with touch, that will affect the operation of the elevator. The touch activation of one of the displayed elevator operation icon, signals the elevator's computer, to activate the elevator operation that is associated to the activated operation icon.

A Control Panel Outside of the Elevator

A control panel on the glasses, outside of the elevator, on the floor that the user is on, next to the elevator entrance doors, is used to call the elevator to the floor the user is on. Physical control panels 212, inside, and outside of the elevator, and glasses control panel use the same, elevator inputs, like, floor number, allow, and show the same interactions, input by the user.

The glasses and elevator system determine the floor the user is on, by using GPS in the glasses, and elevator, and or cell tower triangulation, or range from Bluetooth or WIFI radio transmitters in the elevator.

The Glasses Connects to the Elevator, with Bluetooth, WIFI, or 5G

Elevator control panels (not shown) outside the elevator, which are on different floors, each have, and are connected to a blue tooth, 5 g cell phone transmitters, and receivers, glasses or Wi-Fi Direct radio transmitter and receiver. The control panels connect to one, or more elevator computers. The elevator computer directs the operation of the elevator.

The elevator has mid-air call up, and down buttons, and physical call buttons, located outside of the elevator, on a floor that the elevator doors opens to. To call the elevator, the user activates either the up or down button, by touching either the up or down button on the mid-air display.

Elevator that Moves is Many Directions

The call box displays an either up or down icon, for movement up or down. If the elevator goes sideways the box can also display a left, right forward or back icons; for movement left, right forward or back. The elevator may move diagonally, or in a circular path. Activation of the up icon signals the elevator going in the up direction to stop at the floor the user is on, like, the 5th floor, and allow the user to board the elevator.

Inside the Elevator

When in the elevator, the user active the icons that control the operation of the elevator, while inside the elevator, like, activating the 2 icon, which instructs the elevator to move to the 2nd floor. The activated elevator command signals, the elevator to active the elevator operation, associated to the command.

Commands include, basement floors, parking, ground floor, 1, 2, 3, 4, 5, 6 7, 8 etc., close door, open door, emergency button, user help call, elevator stop, start, and fan. The number 1 elevator operation moves the elevator to the 1st floor. The open-door operation opens the door of the elevator. The stop icon stops, the elevator.

The commands are self-explanatory, descriptive of their association to the operation of the elevator, that they are associated to, such as, the fan button, when activated turns on the fan, when the fan is off, or turns off the fan, if the fan is on.

A physical control panel 212, and user's glasses control panel are located inside the elevator. The inside physical control panel, and glasses control panel are the same, and show the same interactions, input by the user.

Icons Give Visual Feedback

Three possible, user set setting for activation of icons, with finger contact with the icons, Touch of an icon, highlights the icon, further movement of finger activates the icon, or continued contact with the highlighted icon, in a time period, of 0.3 seconds, activates the icon, or the icon is activated on first touch.

The control panel can be enlarged or minimized by the user's touch. The icons give visual feedback, that they are being touched, or have been touched. The icons give visual feedback, that they have been activated, such as, changing color, dimming, changing shape, moving, decreasing in size, moving farther away from the user, and showing text. The icons can change color, or size, when being activated, or touched.

The input icons can be visually pleasing, such as, being similar to a rabbit, a flower, and a person's face. The user can set, and input the shape, avatars, movements, activation actions, and colours used for the buttons.

Customized Control Panels

Each devices control panel can be customized to what the user like, such as, a green colour theme, or travel destinations. The user may feel more connected to a touch screen display control panel, that they have input into its design, then a devices physical control panel, like, an Atm's physical control panel.

Positioning the Elevator Input Buttons on the Glasses' Mid-Air Display

Many devices menu can be displayed, in the display near each other, such as, displaying a vending machine menu, an elevator call button, and an automatic teller machine.

The inside of the elevator, and outside elevator input panel has software operating instructions, for the various functions and devices of the elevator. The elevator instructions are displayed on the menu by the touch screen.

Communicate Distance Between the Glasses with the Elevator

The user can set the distance, that the glasses computer detects external devices, that can be operated by the user. Limiting the distance, may limit the distance that the user needs to travel to a device. Limiting the number of devices detected, might be used to filter out too many available choices. The devices connection range to the glasses' computer may be limited, by the radio range of the transmitter. The location of the device may limit the devices broadcast range, for example, when the glasses are located on a train, traveling past the device.

Glasses Connecting to Multiple Devices

The glasses computer can connect to more than one device at a time, and show the displayed devices, and operate the devices. The glasses computer can connect and operate many public multiuser devices, such as, a gas pump, a medical device, a store checkout station, a smart toilet, an elevator, a vending machine, an ATM, a flammable environment device, a door lock, a car lock, a car ignition, a room temperature thermostat, a television TV, office lights, and gas station microwave oven.

The glasses can operate, the flammable environment public multiuser devices, which may operate a gas compressor's, on off switch. the door's lock, lock or unlocked switch, the car lock's, lock or unlocked switch, the car's ignition, start or accessory setting switch, a gym's room temperature thermostat's, increase, or decrease thermostat temperature switch, an office light's on or off switch, the microwave oven', on or off switch, an office oven operation timer setting, and a temperate setting, the TV's on or off switch, channel number, channel selection, record, pause, sound volume increases or decrease, picture source selection from PVR personal video recorder, or computer, and picture settings.

The glasses can operate medical devices may include, a blood pressure machine, an x-ray machine on off switch, keyboards in a hospital, touch screen displays in a medical environment, an electric hospital bed having a raise or lower bed switch, and hospital TV remote controls for changing the TV channel.

The glasses can operate, more than one device at a time. Two device operating menus can be shown, on the display. The user can input into the operating menus simultaneously, such as, the user can operate a vending machine, while operating the room lights.

The glasses can operate devices made from differing companies, and differing styles of devices. The glasses can operate elevators made from differing companies, and differing styles of elevator. The elevator communicates with the glasses computer. The elevator downloads the elevator operating menu to the glasses. The glasses computer can operate the elevator, by using the user's input of the elevator operating menu, on the touch screen display.

Along with displaying the user's devices, the user may receive and show devices from other users, such as, the other user's desktop printer. The other users could be deleted for the menu of available devices, so that they don't appear on the users display. Unwanted devices shown on the display can be removed.

With many devices displayed, the user may scroll or page thru the available devices. The glasses can connect to a portable computer, and use the glasses computer to, connect to and operate external devices. The user's devices can be password protected, to enable only the user's glasses computer to operate their devices.

More Possible Devices Operated by the Glasses

In an office building or house the available controllable devices would be displayed on the glasses touch screen' display, such as, an on off switch for the following devices, lights, TV, radio, dishwasher, stove, and microwave oven. The office devices can be operated using the screen. The glasses, can find a car in a parking lot, unlock the doors, and start or stop the car's engine. Devices in an industrial work environment can be operated by the touch screen, such as, a milling machine, lathe, or press.

The glasses can operate multi user devices, such as, an on off switch, house lights, house door bell, office door locks, house door locks, car door locks, an airplane control panel. The devices can be programmed to allow only certain users to operate the device, such as, only employees in an office would be allowed to operate an office printer. For example, only certain users would be able to operate a on off switch for a hospital x-ray machine. The glasses being a portable computer, controls lights in a restaurant, office rooms, interior, and exterior lights.

Different Ways of Communicating with the Elevator and or Another Devices

The glasses can act as a control panel, by performing interactions with embedded systems located in its proximity. To support proximity-aware interactions, both the glasses and the embedded systems with which the user interacts have short-range wireless communication capabilities. Bluetooth, 5G, or Wi-Fi direct is used primary for the short-range wireless technology that will enable proximity-aware communication.

Since multiple embedded systems with different functionalities can be scattered everywhere, the glasses can automatically discover, or on-demand embedded systems located in the proximity of the user. This is done using a short-range wireless device discovery protocol.

At discovery time, the glasses learn the identity and the description of these systems. Each embedded system can provide its identity information (unique to a device or to a class of devices) and a description of its basic functionality in a human understandable format.

The user has pre-installed on the glasses, the interfaces for interacting with the embedded systems. An alternative flexible solution is to define a protocol that allows the glasses to learn the interfaces from the embedded systems themselves.

The glasses can connect to the internet, using the 5G cell glasses radio waves that connect to a cell phone network, that is connected to the internet. The glasses wirelessly connect to the phone, the phone is connected to the internet thru the 5G cell antennas.

Dual Connectivity Model

A universal interaction architecture based on the glasses are the dual connectivity model, in which the user connects both to the close-by environment and to the rest of the world through the Internet. This model of interaction is based, on the communication capabilities incorporated in the glasses. They have the unique feature of incorporating short-range wireless connectivity (e.g., Bluetooth, WIFI, or 4G, or 5G) and Internet connectivity (e.g., General Packet Radio Service GPRS) in the same glasses' personal mobile device.

The glasses are connected to a cell glasses network tower receiver, and transmitter. The glasses receive and transmits, data on the cell glasses network. This is the enabling feature for a secure and generic framework of services over these glasses' networks.

For example, an intelligent smart toilet equipped with a Bluetooth interface, that is in a public multiuser setting. This embedded system is very simple and is not capable of storing or transferring its interface to the glasses. However, it can identify itself to the glasses. Using this information, the glasses can connect to a server across the Internet (i.e., over GPRS) to download the code of the interface that will allow it to become a remote control for the microwave oven.

The glasses can also perform authentication over the Internet to ensure that the code is trusted. All further communication between this embedded system and the glasses happens by executing the downloaded code. This code will display on the touch screen panel that emulates the panel of the microwave (i.e., it effectively transforms the glasses into an intuitive microwave remote control). Recipes can be downloaded from the web that can be downloaded and executed on the microwave. For this purpose, the microwave does not have to be connected to the Internet; it is the glasses that facilitates this action.

Another typical application is opening/closing Smart Locks. The entry in certain buildings will be protected using Smart Locks (e.g., locks that are Bluetooth-enabled and can be opened using digital door keys). The dual connectivity model enables users carrying glasses to open these locks in a secure manner. The glasses can establish a connection with the lock, obtain the ID of the lock, and connect to an Internet server over GPRS to download: The Gateway Connectivity Interaction Model is the code that will be used for opening the lock (a digital door key can also be downloaded in the same time). The server hosting the interface and the keys for the Smart Lock maintains a list of people that can open the lock. The identity of the glasses user (stored on the glasses in the form of her personal information) is piggybacked on the request submitted to the server. If the server finds that this user can open the lock, it responds with the code for the interface and the digital key.

The dual connectivity model can also be used to implement electronic payment applications. The user does not need to know about a vendor's embedded system in advance. The glasses can authenticate the vendor using its Internet connection. The same connection can be used by the user to withdraw electronic currency from their bank and store them on the glasses. Another option provided by the glasses are to send some of the unused money back into the bank account (i.e., make a deposit each time the amount on the glasses exceeds a certain limit). Potentially, the vendor's embedded system can also be connected to the Internet. For instance, this ability can be used to authenticate the user.

Glasses and Elevator Connected to the Internet

The glasses, and elevator are connected to the internet. Their locations are located on a google internet map. The glasses, and elevator identify other devices within their vicinity, such as, the glasses detects elevators, Atms, vending machines, light switches, smart toilets, and the elevator detects the glasses, and other glasses.

The glasses or the user, requests the elevators operating menu, over the internet, when the glasses, are in the vicinity, 6 meters, of the elevator. The elevator sends the glasses, the elevator operating menu over the internet. The glasses download the elevator menu software. The touch screen displays, the elevators menu.

The elevator can also request, over the internet, by the glasses, to receive the elevator menu software. If the touch glasses, agrees to receive the menu software, the elevator sends the glasses, the menu software over the internet.

The glasses, and elevator pre-register their availability to communicate, send and receive menu software over the internet, Glasses Software Architecture This architecture applies to all the proposed interaction models. In the following, is briefly describe the components of this architecture.

A 5G system, WIFI, internet, or Bluetooth Engine is responsible for communicating with the Bluetooth-enabled embedded systems. It is composed of sub-components for device discovery and sending/receiving data. Although the Java API for accessing the 5G system stack has been proposed, it has not yet been implemented. 5G system Engine is a layer above the 5G system stack and provides a convenient Java API for accessing the 5G stack. The downloaded interface is a Java program which cannot access the 5G stack directly. It depends on the Java API provided by the Bluetooth Engine for communicating with the embedded device.

The Internet Access Module carries out the communication between the glasses and various Internet servers. It provides a well-defined API that supports operations specific to our architecture (e.g., downloading an interface). The protocol of communication can be either HTTP or TCP/IP (on top of GPRS).

Discovering the Embedded Systems

The Proximity Engine is responsible for discovering the embedded systems located within the 5G or Bluetooth communication range. If an interface for a newly encountered system is not available locally (i.e., a miss in the Interface Cache) or through direct communication with the system, the Proximity Engine invokes the Internet Access Module to connect to an Internet server and download the interface for interacting with the device. The downloaded interface is stored in the Interface Cache for later reuse.

Together with the interface, an access control handler can also be downloaded. Such a handler executes before any subsequent executions of this interface. The Proximity Engine informs the Execution Engine to dispatch the downloaded interface for execution. All further communication between the glasses and the embedded system happens as a result of executing this interface.

The Execution Engine is invoked by the Proximity Engine and is responsible for dispatching the downloaded interface program for execution. The downloaded interface interacts with the Bluetooth Engine, or 5G system to communicate with the embedded system or with another glasses. This interface may also interact with the Internet Access Module to communicate with the webserver. It may need to contact the webserver for security-related actions or to download necessary data in case of a miss in the Personal Data Storage.

Storing the Code

Interface Cache stores the code of the downloaded interfaces. This cache avoids downloading an interface every time it is needed. An interface can be shared by an entire class of embedded systems (e.g., elevators, or ride share self-driving cars). Associated with each interface are an access control handler that executes before any subsequent invocation of this interface (e.g. It checks if the interface is still allowed to run, sets the permissions to local resources).

Personal Data Storage acts as a cache for "active data", similar to Active Cache. It stores data that needs to be used during the interactions with various embedded systems. Each data item stored in this cache has several handlers associated with it that can perform various actions (e.g., access handler, miss handler, eviction handler). Examples of such data include digital door keys or electronic cash. Each time an interface needs some data, it checks this cache. If the data is available locally (i.e., hit) the program goes ahead; otherwise (i.e., miss), it has to use the Internet Access Module to download the data from the corresponding server in the Internet.

Any embedded system is registered with a trusted webserver (the webserver is just a simplification, since this is in fact a web service distributed on multiple computers). At registration, the webserver assigns a unique ID and a URL to the device. All the information necessary to interact with the device along with a user interface is stored at that URL. This URL may be common for an entire class of embedded systems.

The interaction protocol that takes place when the glasses needs to interact with an embedded system. The user invokes the Proximity Engine each time user needs to interact with a device located in the proximity. Once the embedded systems in the proximity are identified, the user chooses the one they want to interact with. A request is sent to the embedded system to provide its ID and URL. Upon receiving the ID and URL of the embedded system, the glasses execute the access control handler and then loads and executes the interface. In case of a miss in the Interface Cache, the interface needs to be downloaded on the glasses either from the webserver or from the embedded system itself.

Trusted Interface Downloads

An interface downloaded from an embedded system is un-trusted and is not allowed to access to local resources on (i.e., sandbox model of execution where it can only execute commands on the device). The interfaces downloaded from the webserver are trusted; they are assumed to be verified before being distributed by the server.

The glasses request an interface for the ID provided by the device (using the URL provided also by the device). With this request, the glasses also send its ID (stored in the Personal Information Storage). The glasses are granted permission to download an interface, subject to the access control enforced based on the glasses ID and, potentially, other credentials presented by the user. Once the access is granted, the webserver responds with the interface needed for any further interaction with the device.

The data stored in the Personal Data Storage can be classified into three categories: Description of the downloaded interfaces. The code of the downloaded interfaces is stored in the Interface Cache, but its description is stored in the Personal Data Storage.

Every downloaded interface has an ID (which can be the ID of the embedded system or the class of embedded systems it is associated with). This ID helps in recognizing the cached interface each time it needs to be looked up in the cache. In addition to assigning an ID, the access and miss handlers associated with the interface are also defined. For instance, the user might define the time period for which the interface should be cached, or how and when it can be reused.

Confidential Data

Example of confidential data include electronic cash or digital keys. Every confidential data item has a data-ID and handlers associated with it. The handler's define a mechanism for evicting the data entity, sharing it across applications, or controlling the access to it. For instance, electronic cash can be sent back to the bank at eviction. The handlers also let the glasses user have control, over the confidential data stored on the glasses.

Any application that needs to access a confidential data item accesses it through the handler. The data item handler may either have an access control list of applications that are allowed to access it, or may pop up a choice menu to the user every time an application tries to access the data entity. Handlers are also provided for fetch data in from the corresponding server when it is missing in the cache.

Personal Information of a User

Personal information of the user in form of his name, credit card information, is stored in this cache. This information is used for authenticating the user to applications that require that level of security, such as the digital-key application mentioned earlier. Personal information is primarily accessed by the architecture components of the glasses. Applications may access this information through the handler associated with this data.

Finding and Operating an Elevator with Glasses Map Operation

Finding the Elevator

The user connects to the internet thru the mobile glasses network, or thru a WIFI connection, shown in FIGS. 3, and 4. The user types in elevators, in the search window, using the virtual key board. Elevators that are available for operation, by the glasses are displayed. The displayed elevators show a description, of the elevators, such as, the floors being used by the elevator, like, 5-8 floors.

The user touch chooses one of the elevators and chooses to have directions and routes to the elevator shown. The routes include the time to the elevator, by car, waking, and public transportation, bus, or subway. The user follows one of the shown routes, to the building with the elevator.

Route Inside the Building

Inside the building, the user follows the route, on the map of the building to the elevator. The map includes, the route on a 1st floor, and stairs to take to the floor that the elevator is on, such as, 2nd floor. Once on the 2nd floor, the map shows a 2nd floor map with route to the elevator.

Example of Elevator Operation

When the user is close to the elevator, like, 40 meters. The elevator icon is activated, by touch by the user. The elevator control panels, outside call buttons, and inside control panel are displayed on the display.

Elevator Calling Button Outside the Elevator

Buttons include, up or down buttons, ranges from, like, floor 8-14 or 1-7. The user touches the up button, while on the 1st floor. The up-button changes from an orange color to a green color, to signal that the up button us activated. The glasses show the floors that the different elevators are on. The elevator going up stops, and the elevator door opens allowing the user to enter the elevator.

Inside the Elevator

The letter associated to the elevator control panel is displayed automatically. The user can also manually choose the g letter elevator panel from the display, which shows all the elevators, and the letters associated to each elevator, like, d, e, f, g. The elevator letter g is displayed inside the elevator.

The user touches the 4th floor icon, and the doors start to close. The user presses the door open icon, to stop the door from closing, reopen the door, to allow another passenger to enter the elevator. The user presses the close door icon, and the elevator doors close. The elevator moves to the 4th. The elevator doors open, and the user vacates the elevator. At 20 meters the control panels are removed from the display.

Finding and Operating a Gas Pump with Glasses Map Description

The glasses have a displayed map. The map has a search window.

Typed search results for devices, like, gas station gas pump, show displayed icons associated to the devices, at locations on the map, that are associated to the locations of the gas pumps. The gas pump icons visually describe pictorially, or in writing the gas pump, such as, a drawing of a gas pump, or the word gas pump is spelled.

Gas Pump Product Choices

Displayed commands include, octane of gas 87, 89, 91, 93, 94, price gas per or litre or gallon, pay with credit card or cash. pay with glasses wallet.

The glasses receive feedback information, that is displayed, while the gas pump is operating, such as, how much gas is being pumped, how much is the cost of the gas being pumped.

Reducing static sparks, can improve the safe operation of a gas station gas pump, by reducing the chance of a static electric spark igniting gas fumes.

Finding and Operating a Gas Pump with Glasses Map Operation

Finding the Gas Pump

The user types in gas pumps, in the search window, using the virtual key board. Gas pumps that are available for operation, by the glasses are displayed on the map. The user follows a route to one of the gas pumps.

Example of Gas Pump Operation

The glasses connects to the gas pumps. The user picks one of the displayed gas pumps, from many gas pumps. The user touches the gas pump icon that's says pump number 3, to open the 3 pump's control panel.

The user touches the 87-gas octane icon on the control panel, and the 87 is highlighted. The pump is turned on. The user pumps gas into a car. The user pays by touching the credit card pay icon, the credit card on the glasses are charged for the payments.

Gas Pump

The user uses the interactive input display, to operate a gas pump. The user can activate the pump's input icons, by touching the displayed icons. The user touches the gas pump input icons, to choose the octane of gas, or pay for the gas. The activated icons, are displayed, are associated with the operation of the pump, and activate gas pump functions, such as, delivery of gas, or payment of the gas. The glasses receive feedback information, while the device is operating, such as, how much gas is being pumped.

Figure 1A:
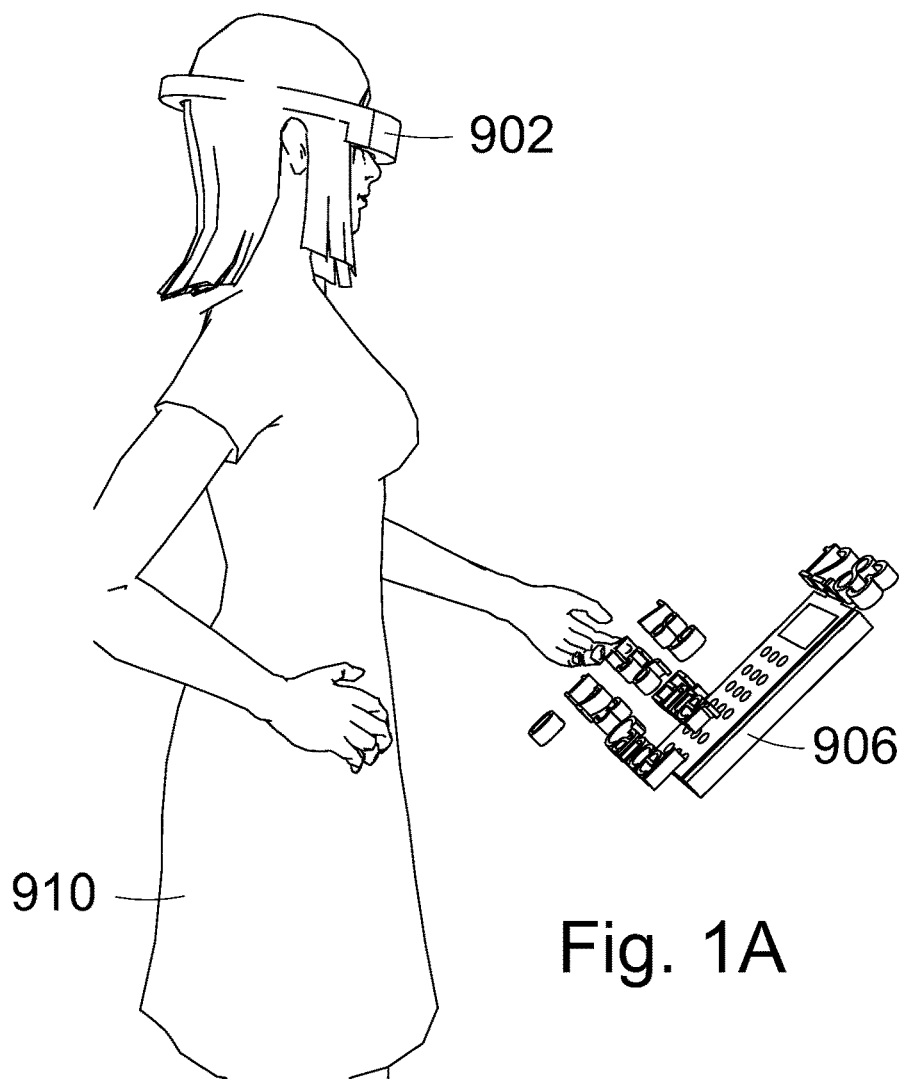
Figure 1B:
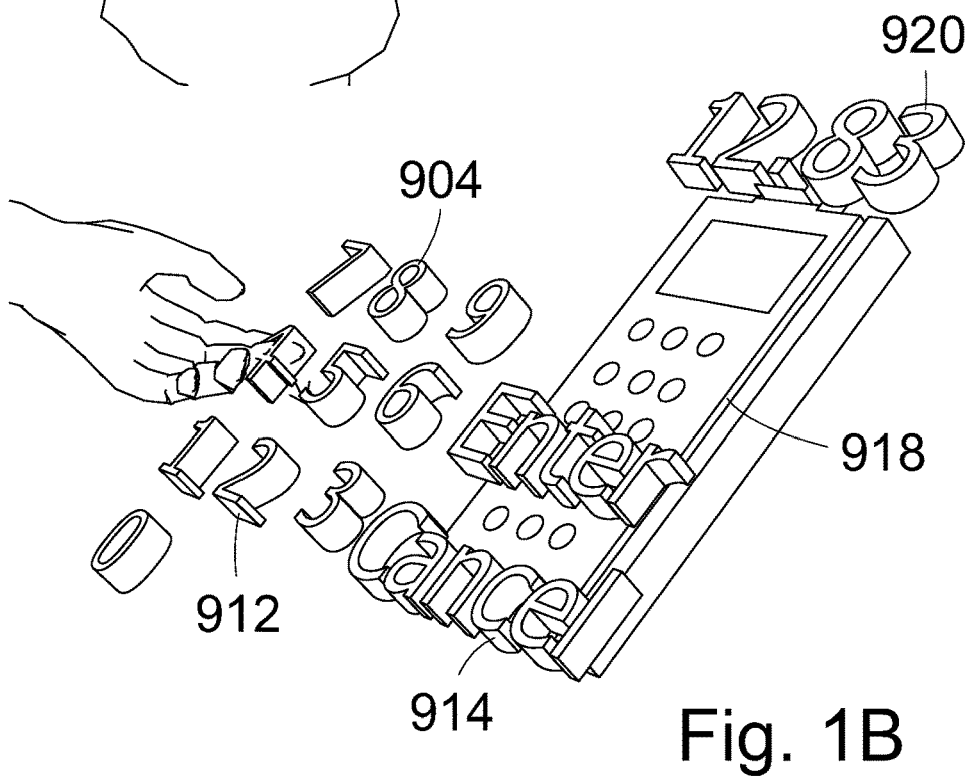
Figure 2:
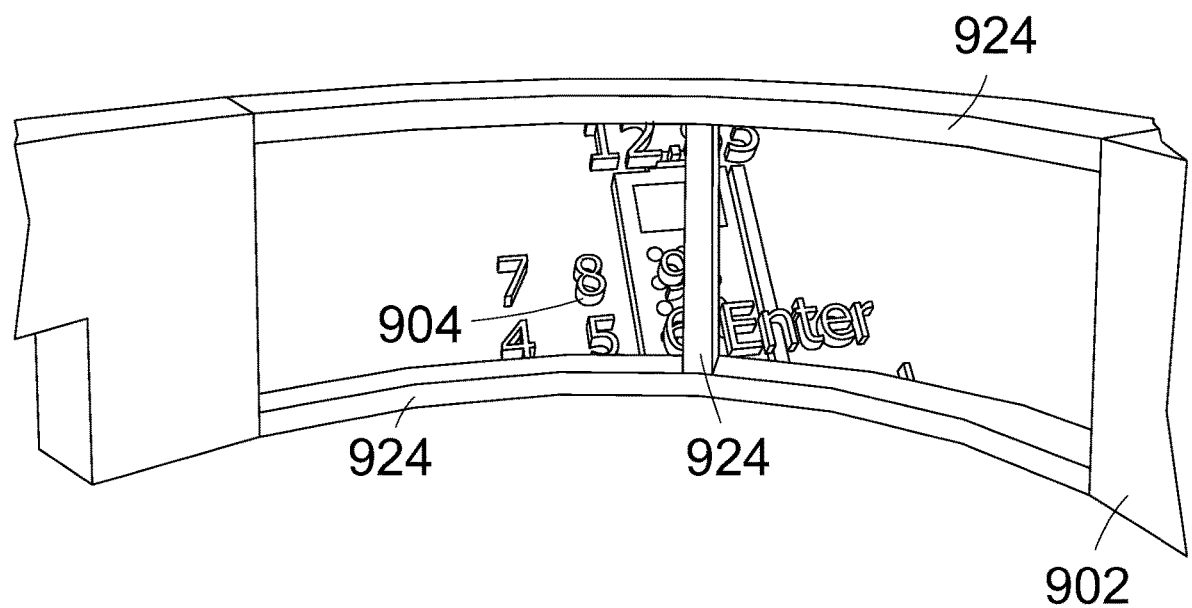
FIG. 2 shows a close-up perspective view, of a mixed reality glasses with mid-air input icons, for a self-serve store checkout machine.

Finding and Operating a Self Serve Store Checkout Machine with Glasses Map Description User Finds a Store by a Using Map The user 910 can find a store's location, on a displayed map in mid-air, as shown in FIGS. 1A, 1B and 2. The user types in store, in the search window, using the virtual key board. Stores that are available for operation, by the glasses are displayed on the map. The user follows a route to one of the stores. When the glasses are in the store, the glasses 902 connect to the store's computer.

Users Waiting to Use the Self-Serve Checkout Machine

With self-serve multiple checkout machines, each checkout machine is assigned, a number, or letter, or designation for each checkout machine, like, 1, 2, 3, or a, b, c, and d. The user touch chooses the checkout machine that they want to use, from the display checkout machines. The checkout machine, can be self-serve, or a store employee can check the user out, at a manned checkout machine.

Automatically Determining which Checkout Machine, the User Wants to Use

The glasses using the devices locations, gps, cell tower triangulation, to determine which checkout machine the user is in front of. When its determined which self-serve checkout machine the user is in front of, the checkout machine can send the glasses the panel, and the glasses can automatically display the checkout machine panel for the checkout machine that the user is standing inf front of. The automatic panel displays the panel with the letter, associated to the checkout machine the user is occupying.

The checkout machine can also use the facial recognition to identify the user, viewing the user thru the camera on the glasses. The identified user is viewed, by a checkout machine camera positioned to view users in front of the checkout machines, to determine which checkout machine the user is standing in front of. By using the facial recognition to identify the user in front of the checkout machines, and then where the user is located. The glasses can also view a number on the self-serve machine, and sends the control panel, with a number similar to the psychical number to the glasses.

The glasses control panel is displayed for the checkout machine, that the user is in line for. If the user changes lines, the control panel will change to the line the user is in. The line for the checkout machine the user is going to use, is assigned a number on the panel, and the same number on the machine, that the user can view.

The user can also manually change the checkout that they want to use, by touching a different checkout icon.

The touch screen on the glasses' screen can be used to shop in a store, without interacting with a store employee. The user can self-serve checkout at a self-serve checkout station, by using touch to activate input items on a store self-serve check out pay station.

Store Commands

Store input icon commands correspond to operations of the checkout station like, enter, cancel 914, look up vegetable or fruit item, bananas, or celery. Pay for the order with debit card, or credit card, or cash, and can also donate to charity.

The finger touches the number 8 icon 904, and the 8 is activated. The 4 is used to type, a personal identification number PIN, into the computer. A 2 number 912 can be touched, to input the amount of 2 oranges the user has, when asked by the checkout how many oranges the user has.

The glasses' mid-air touch screen displays, the checkout station control panel. The user checkouts using a barcode scanner incorporated into the checkout station, by scanning the items barcodes with the checkout station barcode scanner. The user can also checkout using a barcode scanner incorporated into the glasses, by scanning the items barcodes with the glasses barcode scanner.

The scanned items, and prices of the items, are put in an order, containing the products that the user is purchasing. The order is displayed on the glasses' display. The prices of the products are added, together to calculate a total price for the products.

Store items can include, socks, milk, bread, coffee, shoes, multi vitamins, bread, toilet paper, mints, gum, frozen vegetable, bananas, apples, orange juice, hot dogs, cat food, dog food, car oil, pants, shirts, candles, note books, jackets, shorts, tennis rackets, hamburger, salmon, dish washing soap, potation chips, chicken soup, spinach, canned beans, bran cereal, potatoes, onions, avocados, celery, mushrooms, blueberry pie, pizza, french fries, and ice cream The user can pay for the items on the display with a credit card that is stored on the glasses, and shown on the glasses' screen, with a store credit card reader 918. The items anti-theft devices connected to the items, can be turned off after payment.

The camera in the glasses, can view the items before payment, to make sure the user hasn't made a mistake with the number of items, and that all items have been charged. If a mistake is detected the glasses audibly and visually alerts the user.

The checkout process is monitored by store employees, who view the process on store display screens, and view the same screen that the user touches, and viewed by the user. The user could also pick items, record their barcode on the glasses, have robots assemble the order, and at checkout have the recorded items brought to them.

The user can also touch with their fingers, detected by finger trackers 904 in the glasses 924, a mid-air touch screen, one of the displayed items, that they want to activate, such as, the enter input icon command, the enter icon command is clicked, and activated.

The glasses mobile device computer, and external devices use a universal software enabling the communication between the mobile device computer and the external devices. The mobile device computer, and devices use a universal software platform of software, and hardware, which allow the devices computer to communicate with the glasses computer.

The products can be equipped with anti-theft devices, that signal that they haven't been purchased, and if the user leaves the store without paying, an alarm would signal. The order is payed for with a credit card, that is inserted into a credit card reader 918, or is stored on the glasses.

Finding and Operating a Self Serve Store Checkout Machine with Glasses Map Operation Route Inside the Building Inside the building, the user follows the route, on the map of the building, to the checkout machine, as shown in FIGS. 1A, 1B and 2. The map includes, the route on a 1st floor, and stairs to take to the floor that the checkout is on, such as, 2nd floor. Once on the 2nd floor, the map shows a 2nd floor map with route to one of the checkout machines.

Example of Checkout Machine Operation

When the user is close to the checkout machine, say, 10 meters. The checkout machine icon is activated, by touch by the user. The activated checkout machine icon activates, the displaying of the checkout machine's control panel.

The control panel for the checkout machine is displayed. The user touches the start icon on the panel, and the start screen is displayed. The user scans a can of soup, the price and soup are displayed. The user touches a checkout icon, the user inputs 3 bags purchased. The pay icon is touched, and credit is touched. The purchase amount 920 is displayed. The user pays with the credit card stored on the glasses, by touching pay with credit card icon.

On Off Switch in a Dust Free Environment Description

MR glasses hologram input, may be beneficial to device input, in a dust free environment, such as, an on off switch for a microprocessor fabrication machine, in a dust free environment. Hologram input displays don't have moving parts. Physical key boards have moving parts, whose movement may create friction, which can create dust.

When a finger or glove touches a surface to input, the touching of the finger to the surface, creates friction between the finger and the surface. The friction causes particles from both surfaces detaching from the surfaces, and becoming airborne. The particles then descend to a surface, which creates dust on the surface. Dust on the surface of a microprocessor, may have a negative impact on the microprocessor's production.

A holographic keyboard is connected to a computer in the dust free environment. The on off switch is connected to the microprocessor fabrication machine, and turns the machine on when the on icon is activated.

On Off Switch in a Dust Free Environment Operation

The user views the different hologram button inputs. Each button is associated to a selection, of one of a variety of operations of one of the devices, in a dust free environment, such as, the computer, or microprocessor fabrication machine. The user chooses a hologram, to select the desired device operation.

The software detects, in the images from the camera, the user touching the activation area. The device operating instructions associated to the hologram, are activated. The activated instructions for the operation of the dust free environment device, are sent to the device. Operations of the device, may include, the turning on or off, of the device.

The user can turn the device on or off, by touching in mid-air either the on or off hologram. The detected touch is interpreted, as an input by the user. The input is associated to, either an on or off input. The sensor connected to the computer, detects the touch of the area. The device's operation is affected by the input from the switch.

Locating the of touch input area below the holograms, allows the user to touch the hologram before committing to the touch input. The touch input occurs by moving their finger forward, and closer to the hologram, and contacting the input area.

An audible sound is produced by a speaker when the finger contacts the input area. The sound could be a beep sound, or a bell sound. The sound informs the user that their finger has contacted the input area. A sound is produced 0.4 cm before the finger contacts the input area, to inform the user that their finger is close to contacting the input area.

A sound is produced by the speaker when the finger is 0.5 cm closer to the hologram then the input area, to inform the user that they are close to touching the hologram with their finger. The sound enables the user to move their finger away from the hologram, before contacting it with their finger.

A unique sound is associated to each hologram that is touched. The sound enables the user to audibly associate the sound, to the hologram they are touch activating.

A Device Operated in a Flammable Environment Description

Figure 8:
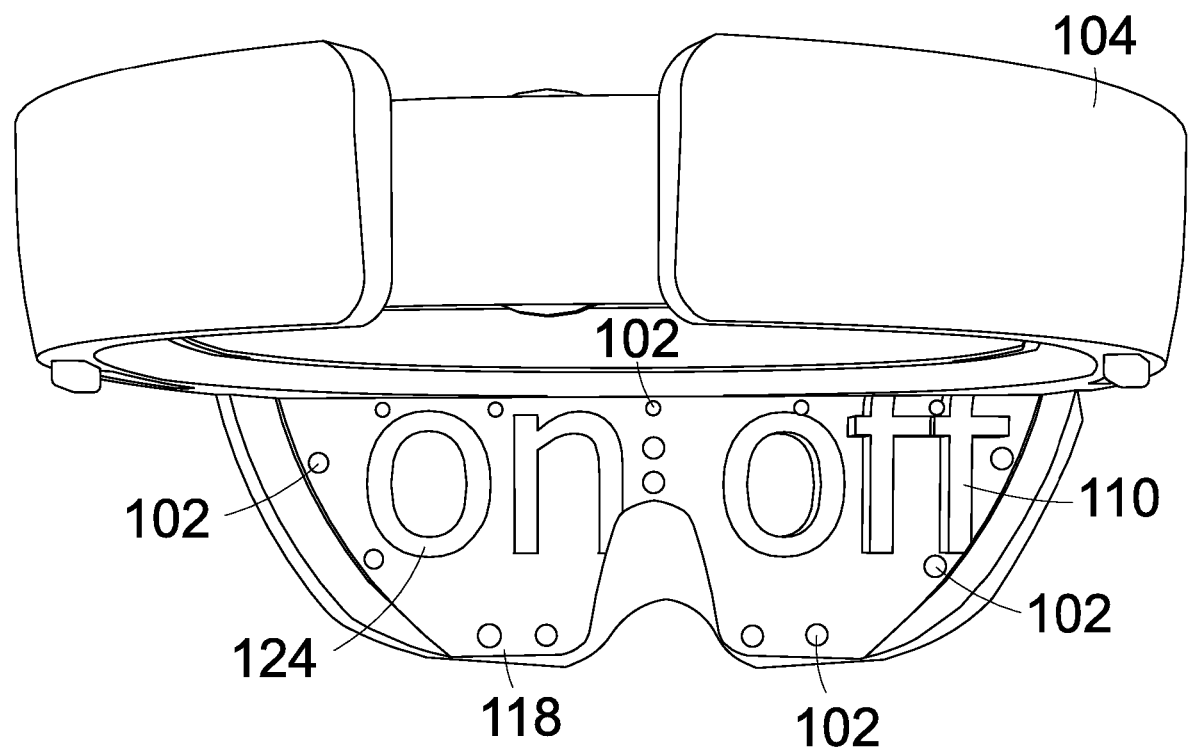
FIG. 8 shows a close-up perspective view, of mixed reality glasses, with input icons, for a multi-user on off switch.

Touch input of an on 124, and off icon 110 using holograms hologram icons, may be beneficial in a flammable environment, as illustrated in, FIGS. 7, and 8. By eliminating electric discharge from a user's finger while touch inputting. Electric discharge might ignite airborne flammable particles.

The icons are part of a control panel 116, for the device. The glasses 104 have hand trackers 102, that are positioned to view the user's hand contact with one of the mid-air icons. The control panel is projected, on a display 118 in the glasses, which gives the illusion that the panel is located in mid-air, when viewed by the user. Touch of the on icon, highlights the area 122 around the on icon.

An on switch, and off switch using holograms, is operated in the flammable environment. The switch deceases the chance of a static electric spark from being created when the finger touch's an input surface, such as, when the user's finger contacts an on off switch's physical input surface. The chance of a flammable vapor or particle igniting in the flammable environment, is decreased, by decreasing the chance of a static electric spark.

Holograms associated to an operation of the device, may include, a variety of different holograms, or hologram inputs, such as, numbers or letters, and device commands, such as, enter 108, search, pin number, toilet, browser, for inputting into the device.

Electric discharge from the user's finger 114 to a surface input button, is eliminated by touch inputting into one the holograms. The hologram is in mid-air, and isn't grounded. Eliminating the electric discharge, decreases the chance of an igniting flammable material, or combustible vapours in the flammable environment.

Flammable environments can include, grain elevators with grain dust, petroleum refineries, and hydrocarbon carrying oil tankers. Devices in the environments can include, a gas compress, a ventilation device, communication devices, and a fire extinguisher system. Mid-air input displays may be used in space stations, where static electric may be a problem, caused by the dry air environment.

Reducing static sparks, can improve the safe operation of a gas station gas pump, by reducing the chance of a static electric spark igniting gas fumes.

A Device Operated in a Flammable Environment Operation

The user views the different hologram button inputs, with MR glasses 104, as illustrated in, FIGS. 7, and 8. Each button is associated to a selection of one of a variety of device operations. The user touch chooses a hologram, or combination of different holograms to input, and to select the desired device operation.

The activated instructions for the operation of the device in the flammable environment are sent to the device in the flammable environment. Operations of the device, may include, the turning on or off of the device.

Keyboard Key Icons Description and Operation

A camera in the glasses, views the users fingers as the user's fingers touch a hologram. The holograms are part of a virtual qwerty keyboard. The keyboard is displayed in mid-air by the glasses, when the finger contacts the display.

The visual detection of the touch of the hologram, is an input of the touched hologram. The hologram display shows letters, that have been typed, and are being typed, on the mid-air display. The letters are typed, where a cursor on the display, is placed by the user's finger.

The typed letters can also be viewed, on a physical electronic display. Letters include a-z, numbers, 1,2,3-9,0, punctuation, coma, and symbols, keyboard commands, enter, shift, space bar, tab, caps lock, and an at sign.

The virtual cursor on the display, can be moved by finger contact with the cursor, and then the cursor following the fingers, movements. The finger moves the cursor on the display, between the letters. The cursor can also be placed, or moved to where the finger, contacts the displayed letters.

Mid-Air Touch Operation of a Device Flow Chart

Glasses display virtual images. The glasses are mixed reality glasses. The glasses are wirelessly connected to a device. The virtual images are icons, the icons are input icons.

The icons are displayed in mid-air air. The icons are viewable by the user while the user wears the glasses. The icons are located to be contacted by the user's finger.

A hand gesture sensor is part of the glasses. The hand gesture sensor is positioned to detect the user's finger's contact with one of the icons.

The device has a plurality of operations that are different from each other. Each icon is activatable by a detection of the finger's contact with one of the icons. Activation of one of the icons is associated to an activation of one the operations of the device.

Each icon displays the operation of the device that the icon is associated to. The detection of contact of the finger with one the icons is associated to the activation of the icon that is detected being contacted by the finger.

Information about the activation of the operation of the device is sent to the glasses. The received information about the activated operation is displayed in mid-air.

Additional Points

The glasses have a map. The map is displayed. The map has a search box. The glasses have a virtual keyboard connected to the search box. Touch of a letter on the keyboard is displayed in the search box. Touch activation of a name in the box search box displays locations on the map of devices with the name, Connection The glasses' detection of the user's finger's contact with one of the displayed devices connects the contacted device to the glasses. The glasses and device are configured to connect automatically at a predetermined distance. The device sends the device's input icons to the glasses when the device and the glasses connect.

The device's icons are stored on the glasses' computer. The glasses are configured to display the stored icons when the glasses connect to the device. The wireless connection is a wireless connection to an internet.

The devices include, an elevator, a smart toilet, a car that drives its self, a self-serve store checkout payment device, a vending machine, an automatic teller machine, a gas pump, a car radio for a self-driving car, a keyboard connected to a computer, a device having an on off switch, a static electric free environment device, a flammable free environment device, a dust free environment device, a public multiuser device, a public multiuser device, a self-serve fast restaurant menu, a light, The device sends the device's input icons to the glasses. The wireless connection is a radio wave connection. Pinning the icons to a location in mid-air.

The sending of the device's input icons from the device to the glasses are the connecting of the glasses to a webpage that displays the input icons, the web page is displayed in mid-air.

The user's touch of the input icons in mid-air, enables touch free operation of the device which is a public multiuser device, allows the user to avoid touching possibility harmful bacteria which might be on physical input buttons of the device.

The glasses have a processor, a storage, and glasses software. The wireless connection is the glasses connect to a phone, and the phone is wirelessly connected to the internet, thru cell phone towers.

Additional Software Flow Chart

Displaying images in mid-air with glasses. Having the glasses be mixed reality glasses. Having the images be icons that are input icons. Displaying the icons to the user while the user wears the glasses.

Connecting the glasses to a device wirelessly. Locating the icons for contact by the user's finger. Associating each icon to a different operation of the device. Displaying the operation of the device that each icon is associated to.

Having the icons activatable by detection of contact of the user's finger with the icon with a hand gesture sensor positioned to detect the finger's contact with one of the icons. The hand gesture sensor being part of the glasses.

Associating the activation of one of the icons to an activation of the device's operation that the icon is associated to. Detecting the finger's contact with one of the icons.

Activating the icon that is detected the finger contacting. Activating the operation of the device that the activated icon is associated to.

Sending information about the activation of the operation of the device to the glasses. Displaying the received information about the device's operation in mid-air.

CONCLUSIONS, RAMIFICATIONS AND SCOPE

From the preceding description, and drawings it becomes apparent that the user, may use glasses to find, and operate multiuser devices sanitarily. Public devices, are now able to be found, and operated by the user with the glasses and glasses map.

The user can find a public device, with a map on the glasses, and operate the device, with mid-air touch, of the mid-air device's control panel. The touch input allows, input to multiuser devices, without the need to contact the device's physical control panel surface.

Avoiding contact with the device's control panel's physical surface, decreases the chance of contacting bacteria on the surface, with the user's finger. Avoiding bacteria increases the ability, to remain free from bacteria, which may have a negative impact on the user's body. For example, the glasses' touch input can be used to direct the operation of a device, such as, an elevator, moving to a floor.

Thus, the reader will see that at least one embodiment, of the glasses connected to a device, and map used to find the device, provides a more reliable, fun, healthier and economical device that can be used by persons of almost any age.

It will be apparent that various changes and modifications can be made, without departing from the scope of the various embodiments.

Having now described some embodiments, of the glasses used to find, and operate multiuser devices, it should be apparent, that the foregoing is merely illustrative and not limiting, having been presented by way of example only. Numerous modifications and other embodiments, are within the scope of the embodiments, and are contemplated as falling within the scope of the embodiments, and claims.

The foregoing description, and drawings are by way of example only. In particular, although many of the examples presented herein involve specific combinations of method acts or system elements, it should be understood that those acts, and those elements may be combined in other ways to accomplish the same objectives. Acts, elements and features discussed only in connection with one embodiment are not intended to be excluded from a similar role in other embodiments.

The invention claimed is:

1. Glasses display virtual images, comprising,
   the glasses are mixed reality glasses,
   the glasses are wirelessly connected to a device,
   some of the virtual images are icons,
   the icons are displayed in midair air, the icons are viewable by the user while the user wears the glasses,
   the icons are located to be contacted by a finger of the user,
   a hand gesture sensor is part of the glasses, the hand gesture sensor is positioned to detect the finger's contact with one of the icons,
   the device has a plurality of operations that are different from each other, each icon is activatable by a detection of the finger's contact with one of the icons, activation of one of the icons is associated to an activation of one the operations of the device, each icon displays the operation of the device that the icon is associated to, the detection of contact of the finger with one the icons is associated to the activation of the icon that is detected being contacted by the finger, some of the virtual images display a map, the map has a search box, the glasses have a virtual keyboard connected to the search box, touch of a letter on the keyboard is displayed in the search box, activation of the search box with a name in the search box displays the locations of the name on the map, each name is associated to a device that the name describes, detection of the user's finger's contact with one of the names connects the device associated to the name to the glasses.

2. The glasses of claim 1, further including information about the activation of the operation of the device is sent to the glasses from the device, the received information about the activated operation is displayed in mid air.

3. The glasses of claim 1, further including the glasses and device are configured to connect automatically at a predetermined distance.

4. The glasses of claim 1, further including the device sends the device's input icons to the glasses when the device and the glasses connect.

5. The glasses of claim 1, the glasses have a computer, the device's icons are stored on the glasses' computer, the glasses are configured to display the stored icons when the glasses connect to the device.

6. The glasses of claim 1, wherein the wireless connection is a wireless connection to an internet.

7. The glasses of claim 1, wherein the device is an elevator.

8. The glasses of claim 1, wherein the device is a smart toilet.

9. The glasses of claim 1, wherein the device is a car that drives its self.

10. A method for displaying images in midair with glasses, comprising, having the glasses be mixed reality glasses, having some of the images be icons that are input icons, displaying the icons to the user while the user wears the glasses, having one of the images be a map, having the map have a displayed search function, having one of the images be a virtual keyboard connected to the displayed search function, displaying a letter on the keyboard contacted by the finger in the search function, activating the search function displaying a name of a device, showing results of the activated search function of the name as a representation of the name located on the map, associating each representation to a device that the representation describes, detecting a contact of the finger with one of the representations connects the device associate to the representation to the glasses, connecting the glasses to the device wirelessly, locating the icons for contact by the finger, associating each icon to a different operation of the device, displaying the operation of the device that each icon is associated to, having the icons activatable by detection of contact of the finger with the icon with a hand gesture sensor positioned to detect the finger's contact with one of the icons with the hand gesture sensor being part of the glasses, associating the activation of one of the icons to and activation of the operation of the device that the icon is associated to, detecting the finger's contact with one of the icons, activating the icon that is detected the finger contacting, activating the operation of the device that the activated icon is associated to, sending feedback from the device to the glasses about the activation of the operation of the device, displaying the received feedback about the device's operation in midair.

11. The method of claim 10, further providing the device sending the device's input icons to the glasses.

12. The method of claim 10, wherein the wireless connection is a radio wave connection, further providing pinning the icons to a location in midair.

13. The method of claim 10, wherein the sending of the device's input icons from the device to the glasses is the connecting of the glasses to a webpage that displays the input icons, the web page is displayed in mid air.

14. The method of claim 10, wherein one of the devices is a self serve store checkout payment device.

15. The method of claim 10, wherein one of the devices is a vending machine.

16. The method of claim 10, wherein one of the devices is an automatic teller machine.

17. The method of claim 10, wherein the device is a car radio for a self driving car.

18. The method of claim 10, wherein the device is a self serve fast food restaurant menu, the glasses is a glasses having a processor, a storage, and a glasses software, the wireless connection is the glasses connected to a phone, the phone is wirelessly connected to the internet, further providing the glasses have a brainwave device, and a brainwave device software, using a search function thought command to input devices into the search function, detecting with the glasses the user's thought description of one of the displayed searched devices, connecting the detected described device to the glasses, activating one the displayed operations by a detection of an operations thought command of one of the displayed operations by the user, whereby the user's touch of the input icons in midair, enables touch free operation of the device which in a public multiuser environment, this allows the user to avoid touching possibility harmful bacteria, which might be on physical input buttons of the device.

* * * * *